(12) United States Patent
Tanaka et al.

(10) Patent No.: US 7,158,669 B2
(45) Date of Patent: Jan. 2, 2007

(54) IMAGE COMPRESSION METHOD AND APPARATUS, AND IMAGE CODING METHOD AND APPARATUS

(75) Inventors: Tetsuomi Tanaka, Kanagawa (JP); Takeshi Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 818 days.

(21) Appl. No.: 10/417,102

(22) Filed: Apr. 17, 2003

(65) Prior Publication Data

US 2003/0198381 A1 Oct. 23, 2003

(30) Foreign Application Priority Data

| Apr. 17, 2002 | (JP) | ............................. 2002-114773 |
| Nov. 27, 2002 | (JP) | ............................. 2002-344574 |
| Mar. 7, 2003 | (JP) | ............................. 2003-061865 |

(51) Int. Cl.
*G06K 9/00* (2006.01)
*G06K 9/34* (2006.01)
*G06K 9/36* (2006.01)
*H04N 1/46* (2006.01)

(52) U.S. Cl. ........................ 382/166; 382/164; 358/538; 358/539

(58) Field of Classification Search ................ 382/164, 382/166; 358/538, 539
See application file for complete search history.

(56) References Cited

U.S. PATENT DOCUMENTS

| 5,267,333 | A | * | 11/1993 | Aono et al. .................. 382/166 |
| 5,446,543 | A | * | 8/1995 | Nakagawa et al. ......... 356/405 |
| 6,246,791 | B1 | * | 6/2001 | Kurzweil et al. ........... 382/162 |
| 6,992,783 | B1 | * | 1/2006 | Sumiuchi .................... 358/1.15 |
| 7,075,681 | B1 | * | 7/2006 | Brothers ................. 358/426.01 |
| 2002/0037100 | A1 | | 3/2002 | Toda et al. .................. 382/166 |

FOREIGN PATENT DOCUMENTS

| JP | 09-098295 | 4/1997 |
| JP | 2000-196907 | 7/2000 |
| JP | 2000-207569 | 7/2000 |
| JP | 2001-045300 | 2/2001 |
| JP | 2002-077631 A | 3/2002 |

* cited by examiner

*Primary Examiner*—Matthew C. Bella
*Assistant Examiner*—Yubin Hung
(74) *Attorney, Agent, or Firm*—Fitzpatrick, Cella, Harper & Scinto

(57) ABSTRACT

There are provided an image coding method and apparatus and image compression method and apparatus which can properly compress a color document image with a high compression efficiency. First of all, a color reduction processing unit (102) converts each pixel of a color document image into an index assigned in correspondence with a color value, and generates color information (103) containing the number of pixels for each indexed color and an index color image (104). A color information sort unit (105) and the like determine, for example, a color value corresponding to an index of the maximum number of pixels as a background color. An order determination unit (113) determines an order. A binary image generation compression unit (109) generates a partial binary image for each index and compresses the binary image according to the order. A data integrating unit (111) generates compressed image (112) by integrating background data (108) and the compressed data of the partial binary image.

21 Claims, 20 Drawing Sheets

FOREGROUND
COLOR IMAGE

INTERMEDIATE
COLOR IMAGE

COMPLEMENTARY
INTERMEDIATE
COLOR IMAGE

FIG. 9
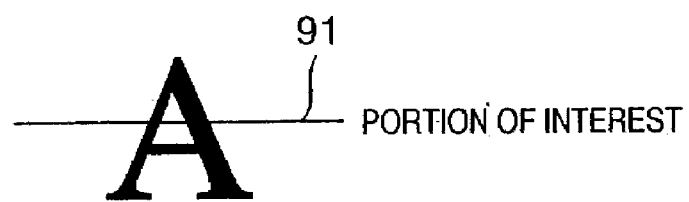
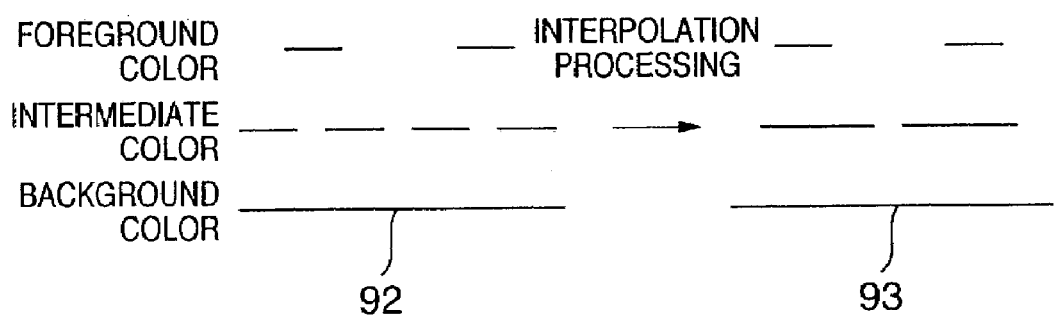

IMAGE COMPRESSION METHOD AND APPARATUS, AND IMAGE CODING METHOD AND APPARATUS

FIELD OF THE INVENTION

The present invention relates to an image compression technique of performing compression processing of a color document image and an image coding technique of encoding a color image.

BACKGROUND OF THE INVENTION

Recently, with the spread use of color printers, color scanners, and the like, many colored documents are generated. This increases the opportunity to capture these documents by scanning and save them as electronic files or transmit them to the third parties through the Internet or the like. Handling these data as full-color data, however, imposes a heavy load on a storage unit or line. For this reason, the amount of data to be handled must be reduced by a method like a compression processing method.

Conventional methods of compressing color images include a method of compressing an image into a pseudo-grayscale binary image by error diffusion or the like, a method of compressing an image in the JPEG form, a method of converting an image into 8-bit palette color image and ZIP- or LZW-compressing the image (e.g., Japanese Patent Laid-Open No. 2002-077631).

Although conversion to a pseudo-grayscale binary image reduces the size (data amount), color information is lost. Compression in the JPEG form, however, causes a tradeoff between compression size and character quality.

According to the method of converting an image into a palette color image and ZIP- or LZW-compressing it, since most color distributions of a color document image are not discrete but are local, holding the image in a multi-bit form results in poor efficiency. As a consequence, this image is compressed with poor efficiency.

According to the method disclosed in Japanese Patent Laid-Open No. 2002-077631, a combination of area determination, binary compression by MMR, lossless compression by ZIP, and lossy compression by JPEG makes it possible to obtain high quality with respect to a general character area. However, area determination is difficult to performed with respect to a portion of a document to which correction is made by handwriting. Such an area is subjected to JPEG compression to result in mosquito noise.

SUMMARY OF THE INVENTION

The present invention has been proposed to solve the conventional problems, and has as its object to provide an image compression method and apparatus which can properly compress a color document image with a high compression efficiency. It is still another object of the present invention to cope with compression of an image having both character and non-character areas as well as the above image having only the color document. It is still another object of the present invention to improve a compression efficiency and realize compression with good reproducibility.

In order to achieve the above objects, according to the present invention, there is provided an image compression method of compressing a color image, comprising an index conversion step of converting each pixel of the color image into an index assigned in correspondence with a color value and generating color information containing the number of pixels for each indexed color and an index image obtained by converting each of the pixels into an index, a background determination step of determining a color value corresponding to a predetermined index in the index image as a background color of the color image, an order determination step of determining, on the basis of the color information and the background color, an order in which the color image is compressed for each index, a binary image generating step of generating a binary image for each index from the index image, a compression step of compressing the binary image according to the order, and a generating step of generating compressed image data by integrating background data containing a size of the color image and a color value of the background color and compressed data of the binary image for each of the indexes.

In order to achieve the objects of the present invention, for example, an image coding apparatus according to the present invention has the following arrangement.

There is provided an image coding apparatus for coding an image, comprising color reduction processing means for generating a color-reduced image by performing color reduction processing of an original image, color information generating means for generating color information concerning an area having a color in the color-reduced image for each color contained in the color-image, partial image generating means for generating a color index image having a color in the color-reduced image for each color contained in the color-reduced image, first updating means for updating and integrating pieces of color information of the pieces of color information generated by the color information generating means which exhibit colors relatively close to each other, second updating means for referring to the color information updated by the first updating means and updating and integrating pieces of color information exhibiting luminance/color differences relatively close to each other, compression means for, in accordance with integration by the first and second updating means, obtaining an OR image based on color index images as a corresponding integration destination and integration source, generating a binary image of the OR image, compressing the binary image, and generating binary image compressed data constituted by the compressed data and the color information which corresponds to the compressed data and updated by the second updating means, and compressed data generating means for generating output data containing data representing a color and contained in the color information of the area having the largest number of pixels, and the binary image compressed data generated by the compression means.

In addition, in order to achieve the objects of the present invention, for example, an image coding method according to the present invention has the following arrangement.

There is provided an image coding method of coding an image, comprising a color reduction processing step for generating a color-reduced image by performing color reduction processing of an original image, a color information generating step for generating color information concerning an area having a color in the color-reduced image for each color contained in the color-image, a partial image generating step for generating a color index image having a color in the color-reduced image for each color contained in the color-reduced image, a first updating step for updating and integrating pieces of color information of the pieces of color information generated in the color information generating step which exhibit colors relatively close to each other, a second updating step for referring to the color information updated in the first updating step and updating and integrating pieces of color information exhibiting luminance/color differences relatively close to each other, a compression step for, in accordance with integration in the first and second updating step, obtaining an OR image based on color index images as a corresponding integration destination and integration source, generating a binary image of the OR image, compressing the binary image, and generating binary image compressed data constituted by the compressed data and the color information which corresponds to the compressed data and updated in the second updating step, and a compressed data generating step for generating output data containing data representing a color and contained in the color information of the area having the largest number of pixels, and the binary image compressed data generated in the compression step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a schematic view for explaining the principle of complementary processing in this embodiment;

DETAILED DESCRIPTION OF THE PREFERRED EMBODIMENTS

Preferred embodiments of the present invention will now be described in detail in accordance with the accompanying drawings.

<First Embodiment>

The following embodiment will exemplify the color image compression technique that can be incorporated in, for example, a color copying machine.

Note that a color copying machine has, for example, a color copying function, color printing function, and color scanner function. The compression technique described in this embodiment can be applied to the color copying function and color scanner function of these functions. More specifically, this compression technique is used to compress the color image data obtained by reading a color original.

The color scanner function includes a data transmission function of compressing the color image data obtained by reading a color original and of transmitting the data outside, and a data save function of compressing the color image data and storing the data in the internal storage means of the copying machine. This compression technique can be incorporated in these two functions.

In this embodiment, this compression technique includes a plurality of compression modes, as will be described below. One of these modes is selected depending on the contents of a color image (color original) to be compressed. This selection may be automatically done or manually by a user.

<<First Compression Mode>>

The compression method to be described in detail below can be executed as an embodiment associated with the first compression mode. This compression mode is suitable for the compression of a color image constituted by a small number of colors. This compression mode can therefore be automatically selected by deciding the color distribution of a color image or by determining character and photographic areas and making a decision on the basis of the ratio between the areas. Alternatively, the mode may be selected by the user manually.

An arrangement or method for the execution of the first compression mode will be described in detail below with reference to the accompanying drawings.

Figure 7:
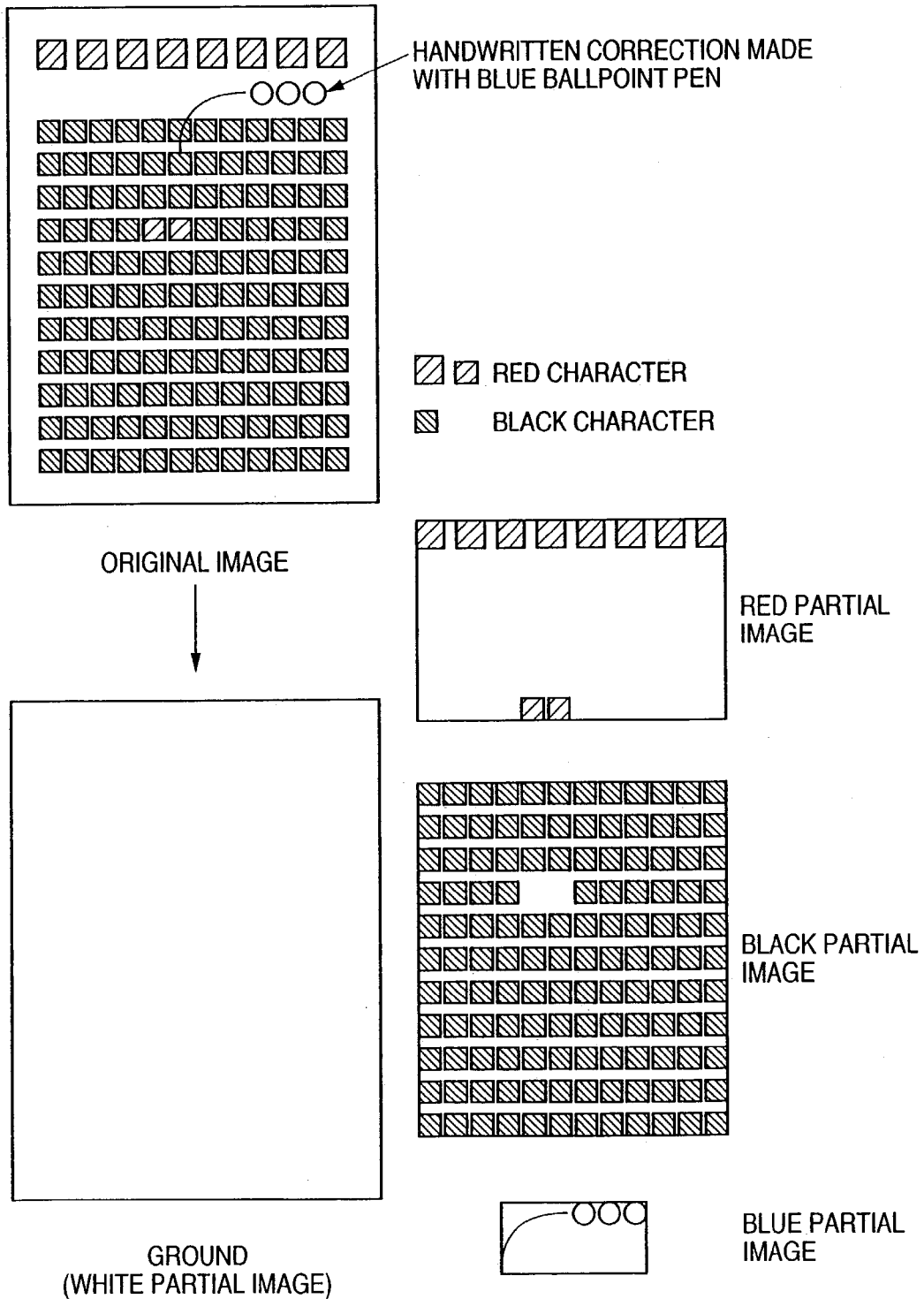
FIG. 7 is a schematic view for explaining data constituting a color document image as a compression target in this embodiment.

FIG. 7 is a schematic view for explaining data constituting a color document image as a compression target in this embodiment. As shown in FIG. 7, an original color document to be used has red and black characters formed on a white ground. In addition, handwritten correction is made to the document with a blue ballpoint pen. Color reduction processing, identical color determination processing, intermediate color reduction processing, and the like are performed for the color image captured by the scanner (i.e., the original image), thereby segmenting the image into partial binary images of white, black, red, and blue.

When the numbers of pixels of the respective segmented color portions are compared with each other, the white color of the ground generally exhibits the largest number of pixels. This color is therefore determined as a background color. The white color determined as the background color is not held as image data but the data is held as the actual size and color value of the original. With regard to the remaining colors, i.e., black, red, and blue, the respective color portions are segmented into partial (binary) images and compressed/saved, as shown in FIG. 7. As described above, a color document image has a local color distribution unlike a natural image such as a color photograph, and is compressed with high efficiency.

Figure 8A:
FIGS. 8A to 8C are schematic views for explaining a background color image, intermediate color image, and complementary intermediate color image.
Figure 8B:
Figure 8C:

FIGS. 8A to 8C are schematic views for explaining a foreground color image, intermediate color image, and complementary intermediate color image. FIG. 8B shows a partial binary image that is not reduced by intermediate color reduction processing. The inside of this image is therefore complemented into a complementary intermediate color image like the one shown in FIG. 8C, thereby reducing the edge amount and increasing the compression efficiency. At the time of image decompression, the complementary intermediate color image and foreground color image are decompressed in the order named. With this operation, the complemented portion is overwritten by the foreground color image serving as an upper layer to reproduce the same image as that without complementary processing. In addition, the compression size can be decreased.

FIG. 9 is a schematic view for explaining the principle of complementary processing in this embodiment. Referring to FIG. 9, if the portion indicated by a transverse line 91 of the image pattern "A" is expressed as a layer, a portion 92 at the lower left position in FIG. 9 is obtained. In this case, an intermediate color is expressed by a pattern having eight edges. Assume that this intermediate color portion is drawn before the foreground color. In this case, even if this portion is complemented as indicated on the right side, the resultant portion looks the same regardless of whether complementary processing is done. In this case, the number of edges of the intermediate color portion having under the complementary processing is four as indicated by reference numeral 93 at the lower right side in FIG. 9, which is ½ the number of edges before the complementary processing. This increases the redundancy of the partial binary image, and hence improves the compression efficiency.

In this case, a high compression priority level is assigned to a color portion having a pattern like the intermediate color image shown in FIG. 8B, the compression size can be reduced. In practice, however, checking image patterns increases the processing load. In general, in a document image, as a foreground color, a color with high visibility is used, such as black on a white ground, or yellow on a blue ground, and a controversial intermediate color is, for example, gray between white and black. If, therefore, the remaining colors left after color reduction are sorted according to their values like luminance or color difference, and a compression order (overwriting order) is determined on the basis of the extracted background color, the same effect as that obtained by checking image patterns can be obtained.

Figure 1:
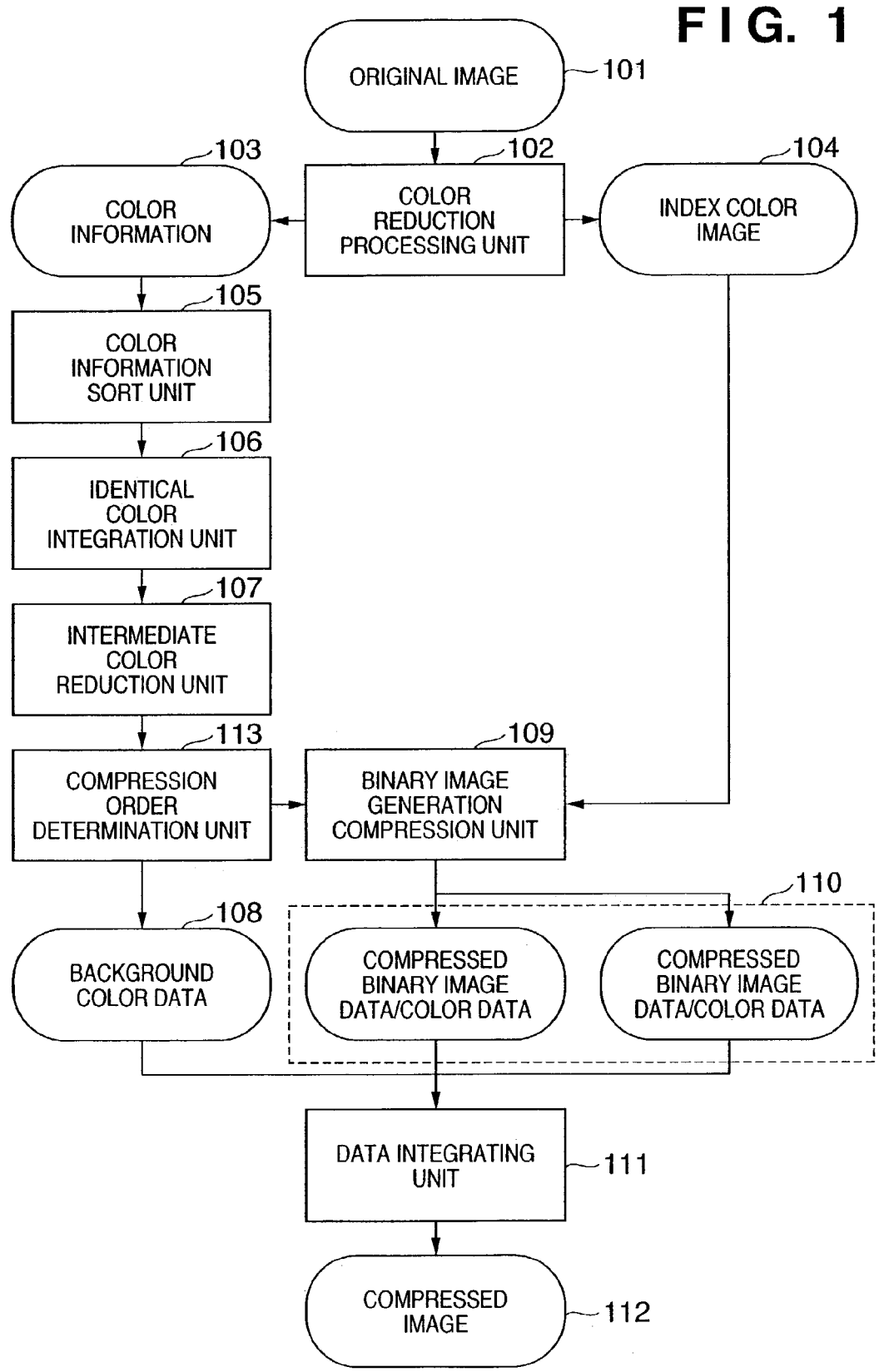
FIG. 1 is a block diagram for explaining the detailed arrangement of a compression apparatus for compressing a color document image in the first compression mode according to the present invention.

FIG. 1 is a block diagram for explaining the detailed arrangement of a compression apparatus for compressing a color document image in the first compression mode according to the present invention. Referring to FIG. 1, reference numeral 101 denotes an original image (color image) obtained by reading a color document with a scanner or the like; and 102, a color reduction processing unit for performing simple color reduction processing of the input original image 101 to reduce the number of colors to a predetermined number of colors, and indexing the image.

Reference numeral 103 denotes color information which is constituted by the number of pixels for each color indexed by the color reduction processing unit 102, a color gravity, and a color distribution range; and 104, an index color image which is output from the color reduction processing unit 102 upon color reduction.

Reference numeral 105 denotes a color information sort unit which sorts the data of the color information 103 according to the number of pixels; and 106, an identical color integration unit which compares the pieces of color information 103 sorted by the color information sort unit 105 with each other to decide identical colors, and integrates them, thereby updating the color information.

Reference numeral 107 denotes an intermediate color reduction unit which integrates pieces of color information near the color information 103 to reduce the number of colors at halftone levels. The color gravity value of the remaining highest rank color information corresponds to background color data 108. Reference numeral 113 denotes a compression order determination unit which sorts the color information reduced by the intermediate color reduction unit 107 according to the luminance and determines a compression order (overwriting order) with reference to the color information of the background color.

Reference numeral 109 denotes a binary image generation compression unit which generates and compresses binary images for each remaining color information other than the background color according to the order determined by the compression order determination unit 113. At this time, an image represented by color information with a high compression priority level is complemented by image data with a low priority level.

Reference numeral 110 denotes compressed binary image data which is constituted by the data generated by the binary image generation compression unit 109, with color information being added to each data; and 111, a data integrating unit which generates a compressed image 112 by integrating the background color data 108 and compressed binary image data 110.

As will be described in detail below, this embodiment will exemplify the image compression method of compressing a color image (a color document image, in particular). According to a characteristic feature of the embodiment, this method is executed according to the following procedure. First of all, the color reduction processing unit 102 converts each pixel of a color image into an index to be assigned to a color value, and generates the color information 103 containing the number of pixels for each indexed color, and an index image (index color image 104) obtained by converting each pixel into an index. The color information sort unit 105 or the like sets, as the background color of the color image, a color value corresponding to a predetermined index in the index image. The compression order determination unit 113 determines a compression order in compressing the color image for each index on the basis of the color information and background color. The binary image generation compression unit 109 then generates a binary image for each index from the index image, and compresses each binary image in accordance with the compression order. The data integrating unit 111 generates compressed image data (compressed image 112) by integrating the background color data 108 containing the size of the color image and the color value of the background color and the compressed data of each binary image for each index.

Figure 2:
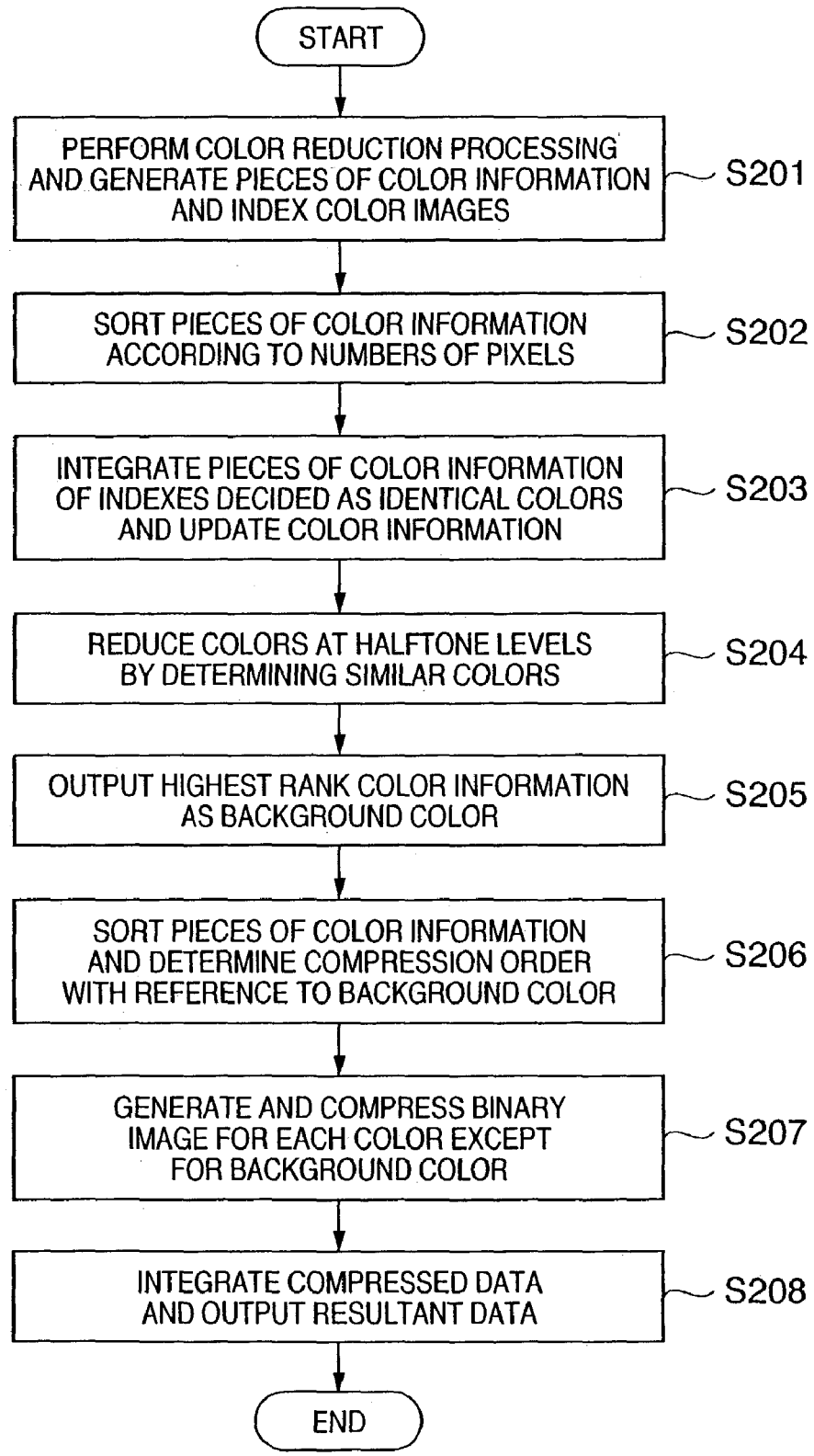
FIG. 2 is a flow chart for explaining the flow of color image compression processing in the first compression mode according to the present invention.

FIG. 2 is a flow chart for explaining the flow of compression processing of a color image in the first compression mode according to the present invention.

First of all, upon reception of the color image which is the original image 101, the color reduction processing unit 102 performs color reduction processing of the original image 101 to reduce it to a predetermined number of colors, and outputs the color information 103 and index color image 104. In this case, according to a characteristic feature of this embodiment, in indexing operation, an index image (index color image 104) is generated, in which the number of bits of the color image is reduced by matching one index with color values in a predetermined range.

Note that color reduction processing in this embodiment is performed to reduce the numbers of bits of R, G, and B of full-color RGB 24-bit data to 2-2-2, 3-3-2, 3-3-3 bits, or the like. Such numbers of bits can be arbitrarily selected depending on the precision of color determination. Assume that in the following embodiment, 2-2-2 bits are selected. The color information 103 output from the color reduction processing unit 102 is constituted by the number of pixels for each color after color reduction, a color gravity (average color value), and coordinate data representing a color distribution range.

According to a characteristic feature of the above image compression method in this embodiment, in the above index conversion processing, in addition to the numbers of pixels, color gravities for the respective indexed colors of the color image and color distribution ranges are counted as color information.

The color information 103 obtained by the color reduction processing unit 102 is then input to the color information sort unit 105 to be sorted according to the value weighted according to the number of pixels and index number (step S202).

In sorting, information with a larger number of pixels is basically positioned at a higher rank. The above weights, i.e., the factors, are values that are so adjusted as to position colors closer to the primary colors at higher ranks when pieces of color information with similar numbers of pixels are compared. FIGS. 3A to 3E are views showing examples of the sorting weighting factors used in the color information sort unit 105 in the first compression mode. As shown in FIGS. 3A to 3E, in this embodiment, factors of 0.9 to 1.2 are assigned to the four gray levels of each of R, G, and B. These values are arbitrary and may be changed in accordance with the number of colors to be reduced by the color reduction processing unit 102 or the priority levels of colors.

The pieces of color information sorted by the color information sort unit 105 are input to the identical color integration unit 106. The identical color integration unit 106 compares the color gravity values of the respective pieces of color information. If these pieces of color information are located close to each other, the identical color integration unit 106 integrates them as having identical colors (step S203). In this processing, colors that are originally identical to each other but separated into a plurality of colors because one of R, G, and B values is accidentally close to a threshold in the first color reduction processing are restored to one color. Of the pieces of color information that are integrated, the color information sorted to a higher rank is left, and the respective data, i.e., the number of pixels for each color, a color gravity, and a color distribution range, are re-calculated.

That is, the image compression processing according to this embodiment is characterized in that identical color integration processing is performed to integrate pieces of color information whose color gravities are close to each other. This identical color integration processing is also characterized in that when identical colors are to be integrated into a color sorted to a higher rank, the counted number of pixels, color distribution range, and the gravity of color values are re-calculated. In addition, the identical color integration processing is characterized in that sorting is performed according to the products of the numbers of pixels for the respective colors of a color image and factors determined in advance in accordance with the positions of the respective colors in a color space, and identical color determination is performed with reference to the sorting order.

The intermediate color reduction unit 107 converts the color gravity values of the pieces of color information updated by the identical color integration unit 106 into luminance/color difference values, compares the values with each other, and integrates pieces of neighboring information (step S204). With this processing, the number of colors positioned at halftone levels is reduced. The purpose of this processing is to remove many grayscale components produced between white and black at the boundary portions between white grounds and black character portions when, for example, even an original which is originally a monochrome document image is read by the scanner. That is, gray close to white is made white, and gray close to black is made black. The remaining colors are processed in the same manner. When sorting is performed according to the magnitudes of the products of the numbers of pixels of the respective colors and factors corresponding to their positions in the color space, and identical color integration processing and intermediate color reduction processing are performed on the basis of the sorting order, the color reproduction is improved by not re-calculating color gravity values.

Note that although the identical color integration unit 106 re-calculates and updates pieces of color information to be reduced and integrated in the same manner as the pieces of color information in step S203, only the color gravity values are left unchanged. This is because the color gravity values are the final display colors, and leaving them unchanged prevents black from becoming brighter by being mixed with gray or prevents white from becoming darker as in the case wherein color gravities are obtained upon integration of intermediate colors. As the representative color of the integrated color information, the color gravity of color information at a high sorting rank is used. In this case, weighting factors are used as well as the numbers of pixels in sorting to give high priority to the primary colors expected to be used for a color document original.

That is, the image compression processing according to this embodiment is characterized in that intermediate color reduction processing is performed to reduce intermediate colors by integrating pieces of color information whose luminance/color differences are close to each other. This intermediate color reduction processing is also characterized in that intermediate colors are reduced with reference to the sorting order. In addition, the intermediate color reduction processing is characterized in that when similar colors are to be integrated into a color sorted to a higher rank, the counted number of pixels and color distribution range are re-calculated, but only the color gravity is not re-calculated.

The color gravity value of the highest rank color information obtained as a result of the processing by the intermediate color reduction unit 107 is output as the background color data 108 (step S205). That is, the image compression processing according to this embodiment is characterized in that the gravity of the color values of a color positioned at the highest sorting rank is extracted as a background color.

In addition, pieces of color information are sorted, and a compression order (overwriting order) is determined with reference to the background color obtained by using the sorting result in step S205 (step S206). Assume that the pieces of color information reduced by the intermediate color reduction unit 107 are five colors with identification numbers 1 to 5, and the background color has identification number 4. In this case, if these colors are sorted as 2, 3, 5, 1, and 4 according to the luminances, then the compression order becomes 1, 5, 3, and 2. In a case of a document having many outlined characters, the colors are sorted as 4, 1, 5, 3, and 2, and the compression order becomes 1, 5, 3, and 2. In a case of a document estimated to have both outlined characters and normal characters, the compression order is set as 5, 1, 3, and 2 to decrease the priority of outlined characters estimated to be low in frequency in use in the document.

A binary image for each color is then generated by using the color information left in the intermediate color reduction unit 107, the result obtained by the compression order determination unit 113, and the index color image 104, and each image is compressed by a method such as MMR (step S207). Note that each binary image generated in this case has a size corresponding to the color distribution range held by color information, and that if such an image exists on only a portion of the document, only the portion is compressed and saved.

In the image compression method according to this embodiment, in determining a background color, a color value corresponding to the index of the largest number of pixels is determined as the background color of the color image. This method is characterized in that determination of a compression order (overwriting order) and generation and compression of a binary image are not executed with respect to this index.

Consider this binary image for each color. If, for example, index numbers 0 to 63 are assigned to the index color images 104, and color information with index 60 and color information with index 62 are integrated into color information with index 63, this binary image is an image obtained by ORing the data with indexes 60 and 62, and is drawn with the color gravity value of the color information corresponding to index 63. This is the basic portion of the binary image for each color, and complementary processing is performed in accordance with the order determined in step S206.

In this complementary processing, the background color has identification number 1, and the order of the remaining colors is 2, 3, and 4. This identification number is a temporary identification number indicating a set of index numbers. If, for example, the pattern of given eight pixels is 1, 2, 3, 4, 2, 3, 3, 1, identification number 2 with the highest priority level is considered first. If only identification number 2 is taken into consideration, the bit pattern is 01001000, which is complemented into bit pattern 01111000. With regard to identification numbers 3 and 4, 00100110 and 00010000 are obtained.

As a result of this processing, compressed binary image data 110 is obtained, which is a group of data constituted by the color values of the data of the respective pieces of color information, the positions and sizes of the pieces of color information, and MMR-compressed data body. The data integrating unit 111 generates and outputs the compressed image 112 by integrating the background color data 108 and compressed binary image data 110 (step S208). That is, the compression processing according to this embodiment is characterized in that a binary image is MMR-compressed.

Figure 4:
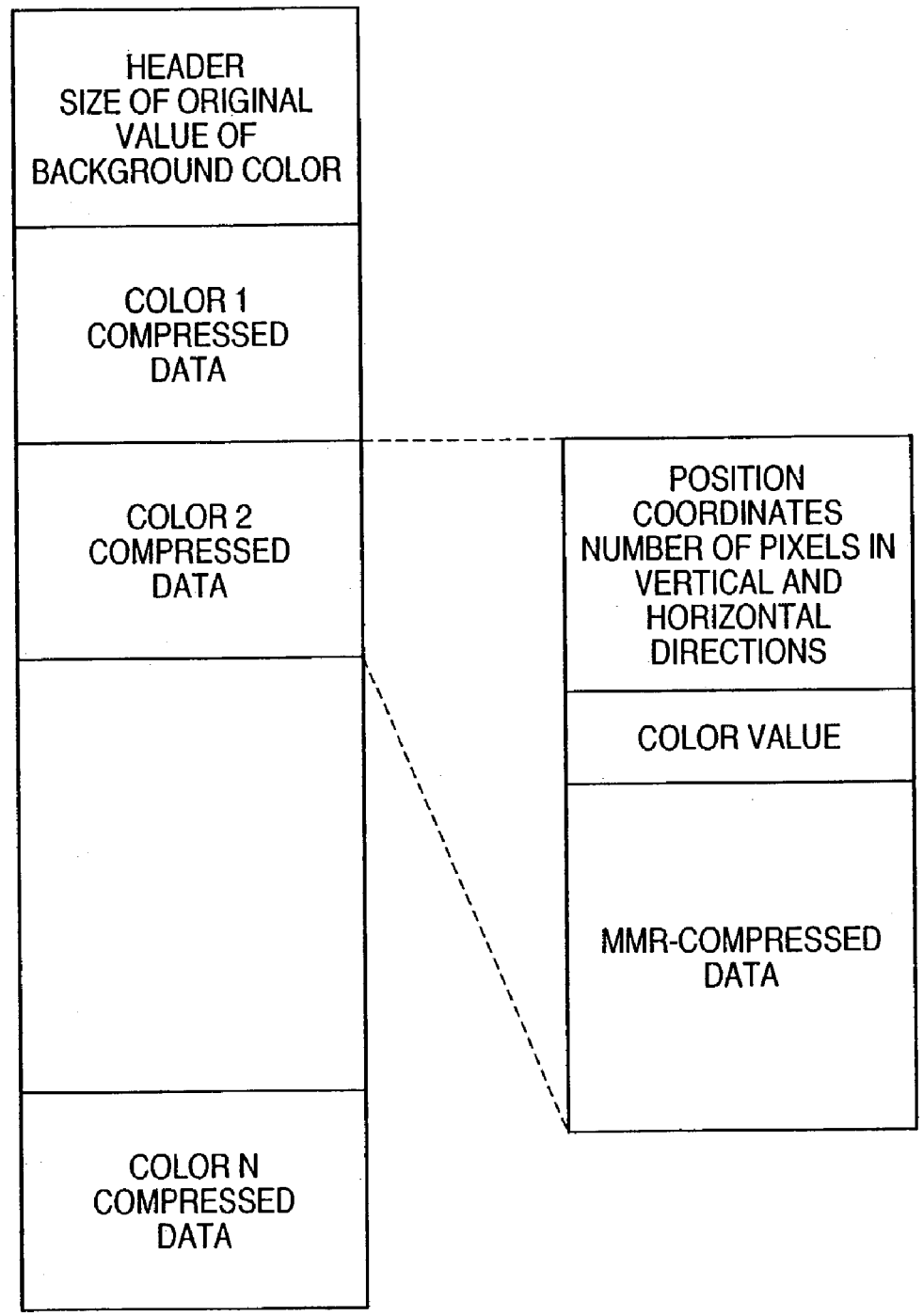
FIG. 4 is a view for explaining the arrangement of compressed image 112 in the first compression mode.

FIG. 4 is a view for explaining the arrangement of the compressed image 112 in the first compression mode. First of all, pieces of information, e.g., the size of an input document image (original), the color value of a background color, and a resolution, are stored in the header portion. In this case, as a background color, a color with the largest number of pixels is basically selected. Therefore, if, for example, an original image is printed on a color sheet such as a red sheet, a reddish color value is input. In general, however, it is expected that a white ground is used in many cases. Therefore, it may be determined whether a background color is white, and the value of the background color may be omitted if it is determined that the background color is white. In this white color determination, if, for example, the respective values of R, G, and B are equal to or more than a predetermined value, the differences between the respective values are within a predetermined value, the ground is regarded as white.

As shown in FIG. 4, compressed data for the respective colors follow the header portion. Each compressed data is constituted by the color value, the position coordinates and size of the color, and MMR-compressed data body. If, for example, the number of colors, excluding the background color, is N, data having identical structures exist in number equal to these colors. Assume that the storage order of these data complies with the compression order determination unit 113. Note that if the input image is a monochrome original such as a white sheet, the data of this portion is not generated.

If the input image is a monochrome original, since the compressed color data count is 1, the data amount becomes almost equal to that of a binary image. In this case, if black pixels exist on only part of the original, MMR-compressed data is obtained by compressing only this part, and the data size becomes smaller than that obtained by general MMR compression.

A method of restoring the compressed image 112 to the original image will be described next. After the entire area of the original is filled with the background color stored in the header portion in FIG. 4, the MMR images of the compressed color data are decompressed in accordance with the order in which they are stored, and the respective images are used as masks to overwrite images at the stored positions in color values, thereby restoring the compressed data to the original image. In this case, the storage order complies with the order determined by the compression order determination unit 113, and decompression is done in this order. Therefore, the same decompression result is obtained regardless of whether the binary image generation compression unit 109 performs complementary processing. Complementing partial binary images in accordance with the compression order in this manner improves the compression efficiency. Determining a compression order with reference to a background color makes it possible to quickly check an order in which the compression efficiency improves when complementary processing is performed.

Figure 5:
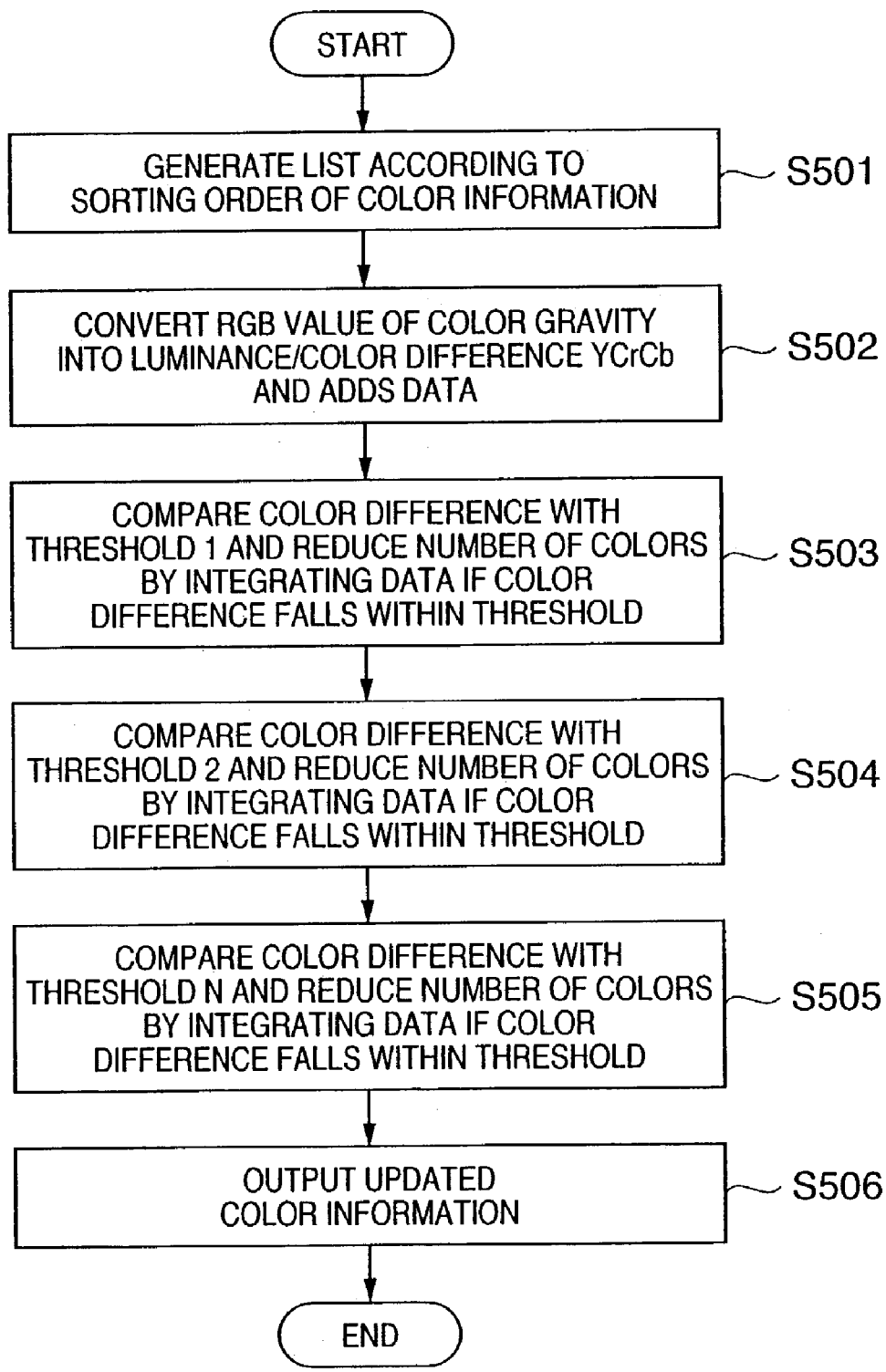
FIG. 5 is a flow chart for explaining the detailed operation procedure executed by an intermediate color reduction unit 107 in step S204 in the compression processing shown in FIG. 2.

FIG. 5 is a flow chart for explaining the detailed operation procedure executed by the intermediate color reduction unit 107 in step S204 in the compression processing shown in FIG. 2.

First of all, a list is generated according to the sorting order of pieces of color information (step S501). Intermediate color reduction processing is then performed in accordance with this list. The RGB value of the color gravity of color information is converted into a YCrCb luminance/color difference signal, and data is added (step S502). Conversion to color differences is performed because this is suitable for reducing intermediate colors by integrating similar colors having similar luminance differences.

Figure 6:
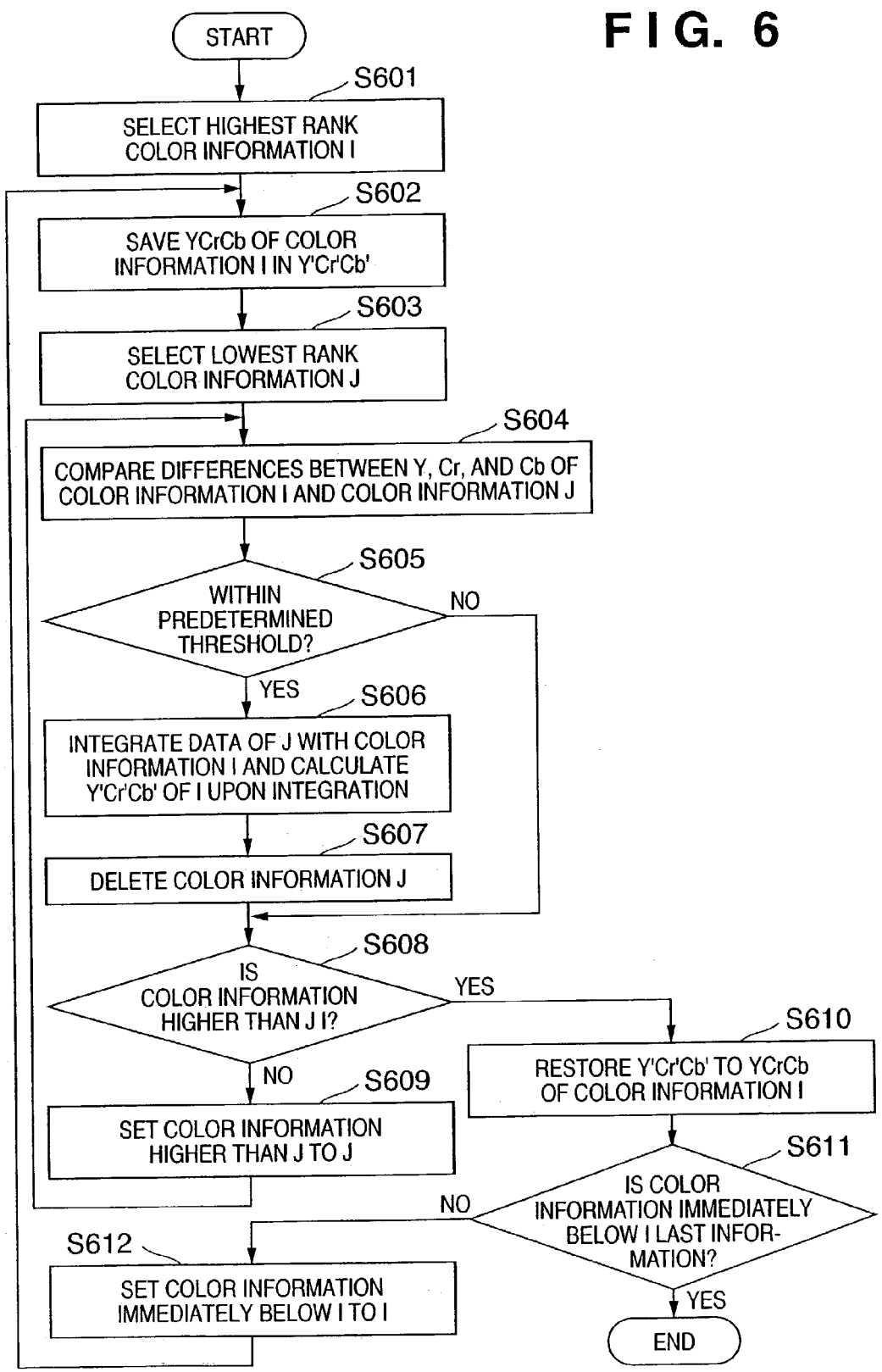
FIG. 6 is a flow chart for explaining the detailed processing in steps S503 to S505 in FIG. 5.

In steps S503, S504, and S505, it is checked by comparison whether the differences between the Y, Cr, and Cb components added to the respective pieces of color information fall within predetermined thresholds, and if they fall within the respective thresholds, the pieces of color information are integrated to reduce the number of colors. FIG. 6 is a flow chart for explaining processing in steps S503 to S505 in FIG. 5 in detail. Assume that the processing in the flow chart of FIG. 6 differs from the processing in steps S503 to S505 only in thresholds used for the comparison of YCrCb.

First of all, color information I is selected as information at the highest rank in the color information list supplied from the processing in step S501 (step S601). The YCrCb value of the color information I is then stored to Y'Cr'Cb' (step S602). The color information at the lowest rank in the list is selected as color information J (step S603).

In this case, the Y, Cr, and Cb values of the color information I and color information J are compared with each other, and it is checked whether the differences are within the thresholds given in steps S503 to S505 in FIG. 5 (step S604).

If it is determined that the differences are within the thresholds (YES), the flow advances to step S606. If it is determined that the differences exceed the thresholds (NO), the flow advances to step S608. If, however, the Cr or Cb values of the color information I and color information J differ in sign, the absolute value of the Cr or Cb value of the color information J is checked. If this absolute value is equal to or more than a predetermined value, this condition is not satisfied. Assume that the difference between the Cr values of the color information I and color information J is within the threshold given in the flow chart of FIG. 5. Even in this case, if these values differ in sign, the absolute value of the color information J is compared with a predetermined value. If this absolute value is smaller than predetermined value, the flow advances to step S605. If the absolute value is larger than the threshold, the flow advances to step S608.

Similar processing is performed with respect to the Cb values. When pieces of color information are integrated after the differences are simply compared, pieces of color information of different colors such as light blue and light red may be integrated depending on the magnitudes of thresholds set in the flow chart of FIG. 5. The above processing is therefore performed to prevent this. In contrast to this, if thresholds are set to prevent integration of different colors such as light blue and light red, similar colors such as blue and light blue cannot be integrated.

In step S606, the color information I is integrated with the data of the color information J. This updates the respective data such as the number of colors of the color information I and the distribution range. However, the color gravity value is not updated. Instead of this operation, the color gravity of the integrated color is calculated and reflected in Y'Cr'Cb' stored in step S602.

The data of the color information J is then excluded from the list (step S607). It is checked in step S608 whether the color information located higher than the color information J by one rank in the list is the color information I. If this information is not the color information I (NO), the flow advances to step S609. If the information is the color information I (YES), the flow advances to step S610.

In step S609, the color information located higher than the color information J by one rank is set to the color information J, and the flow returns to step S604. In step S610, the stored Y'Cr'Cb' value is restored to the YCrCb value of the color information I, and the reference value for threshold comparison in the flow charts of FIGS. 5 and 6 is updated to the color gravity value of the original color information integrated in steps S604 to S609.

It is checked in step S611 whether the color information located lower than the color information I by one rank is the information at the lowest rank or is deleted from the list in step S607 and does not exist. If the information exists and is not located at the lowest rank (NO), the flow advances to step S612. In step S612, the color information immediately below the color information I is set to I, and the flow returns to step S602. If it is determined in step S611 that the color information is at the lowest rank (YES), the processing is terminated, and the updated color information list is returned to the flow chart of FIG. 5.

In this embodiment, the thresholds respectively set in steps S503 to S505 described with reference to FIG. 6 are set such that the threshold for the luminance Y is slightly larger than that for the color differences CrCb to integrate similar colors. In step S503, a relatively small threshold is set to integrate pieces of color information of similar colors whose luminance/color differences differ little, whereas in steps S504 and S505, larger thresholds are set to integrate pieces of color information whose luminance/color differences differ relatively much. The YCrCb value added as a temporary color gravity in step S502 is re-calculated in the flow chart of FIG. 6 to integrate colors without setting very large thresholds in step S504 and the subsequent step.

Assume that in the first processing in step S503, light black is integrated with black. The YCrCb value as a temporary color gravity moves in the direction of light black. In this case, since the distance to dark gray decreases, dark gray can be integrated with black by only increasing the threshold to a certain degree in next step S504 and the subsequent step.

As indicated by steps S503 to S505, multi-step processing is used to integrate colors in the decreasing order of similarity and control the size of the compressed image 112 by changing the number of steps.

As is obvious from FIG. 4, the number of compressed color data is one of the factors that determine the size of the compressed image 112. That is, the compression size can also be controlled by controlling the number of colors that are finally left. For example, increasing the number of colors leads to a quality similar to that of the original color image, whereas decreasing the number of colors leads to a quality similar to that of a simple binary image. The number of steps may therefore be determined in accordance with the quality and compression size to be obtained.

In step S506, this updated color information is returned to the processing in the flow chart of FIG. 2. The processing is then terminated.

That is, the image compression method according to this embodiment is characterized in that a plurality of predetermined thresholds are set in intermediate color reduction processing, the gravity of color values is converted into a luminance/color difference signal, and colors in a threshold range are integrated and reduced in accordance with the sorting order. This processing is also characterized in that the gravity of color values, which is converted into a luminance/color difference signal, is re-calculated as a temporary color gravity every time integration/reduction is performed. In addition, the processing is characterized in that a plurality of thresholds are changed depending on whether priority is given to compression or image quality.

As described above, in consideration of the fact that many color document images have characters of one or a plurality of colors formed on specific background colors, such an image can be compressed more efficiently by having a partial binary image for each color in compression. In addition, image quality and size can be controlled by using a plurality of thresholds in intermediate color reduction processing and controlling the number and values of the thresholds.

Note that this compression mode uses the following procedure. Each pixel constituting a color document image is sorted to any one of a predetermined number of specific colors. One of these specific colors which corresponds to a background is then specified. The respective specific colors are ranked in a relationship in terms of overwriting with reference to the luminance value of the background color in accordance with the luminance values of the remaining specific colors. For each specific color, a concatenated pixel group constituted by a pixel corresponding to the specific color and neighboring pixels is generated. If the neighboring pixels included in a concatenated pixel group corresponding to a given specific color A (corresponding to an intermediate color in FIG. 9) includes a pixel at a position where a specific color higher than the specific color A in the relationship in terms of overwriting (which is preferentially overwritten on the specific color A and corresponds, for example, the foreground color in FIG. 9), the corresponding neighboring pixel is replaced with the specific color A. The resultant concatenated pixel group is compressed. With this procedure, in processing in which a background (corresponding to, for example, the background color in FIG. 9) is regarded as having the lowest priority in a relationship in terms of overwriting, many color document images can be efficiently compressed.

(Modification)

In the first embodiment described above, the compression order was used as the order in which a compression processing of each color was executed. However, the meaning of the order in this invention is not limited to this. This order have can also mean an order in which each decoded color image is overwritten.

In the first embodiment described above, the compression order coincided with the overwriting order. Actually, "the compression order" of each color is able to be modified because each color overwriting order may be adjusted at decoding. However, in this case each order must be adjusted, so it is inefficient.

In order to execute efficient compression processing, it is important that at least a compression processing (more concretely, a complementary processing) corresponding to "an overwriting order" of each color be executed.

According to the above description of the first compression mode, complementary processing is performed only in the primary direction (raster direction). However, if a binary image compression technique to be used can be expected to produce an effect in terms of size by complementing image data in the secondary direction as well, complementary processing may be performed in this direction as well.

In the above description, sorting is performed according to luminance. However, sorting may be done according to the distances between the background color and the remaining colors in the color space. In this case, the above processing is characterized in that a compression order is determined with reference to the distances between the determined background color and the remaining colors in the color space.

According to the above description, in the complementation method, complementation is performed depending on whether a blank portion of the identification number of a target color can be filled with a low-order identification number. However, complementation may be done depending on whether the preceding pixel is 1 or not.

In addition, as in the above description, assume that the identification number is 1, the order of the remaining colors is 2, 3, and 4, and the pattern of eight pixels is 1, 2, 3, 4, 2, 3, 3, and 1. In this case, since identification number 2 is found at the second pixel, 01 is set. Since identification number 3 follows, and the preceding pixel become 1, 011 is set. Identification number 4 then follows, and 0111 is set. In this manner, processing is performed. As a consequence, the bit pattern of the eight pixels becomes 01111110. With regard to identification numbers 3 and 4, 00110110 and 00010000 are set. The resultant bit pattern is therefore different from that in the first compression mode described above. However, the edge amount is the same as that in the first compression mode, almost the same compression size is obtained. In addition, since pixels are sequentially checked, the processing load is light, and high-speed processing can be realized.

<<Second Compression Mode>>

As the second-compression mode, a compression method to be described in detail below can be executed. This compression mode is suitable for the compression of a color image having both characters and non-characters (e.g., a photographic image). This compression mode can be automatically selected by deciding the color distributions of a color image, or may be manually selected by a user.

An arrangement or method for the execution of the second compression mode will be described below.

The steps executed in this mode will be briefly described first. First of all, the luminance histogram of an overall image to be coded is generated and binarized to extract some character areas. Character extraction is then performed with respect to each character area. On the basis of this result, it is checked whether each area should be handled again as a character area. If it is decided that a given area should not be handled as a character area, it is checked whether the object in the area is monochrome. If it is decided that the object is monochrome, the area is regarded as an MMR compression target; otherwise regarded as a JPEG compression target.

If it is decided that the image should be handled as a character area, the number of colors constituting the area is reduced by predetermined color reduction processing. If one color is left as a result of this color reduction processing, a palette representing the color (e.g., (R, G, B)=(20, 30, 40)) is associated with a binary image, and the resultant data is set as an MMR compression target. If the image can be expressed by a predetermined number of colors (e.g., four)

or less as a result of color reduction processing, a palette representing each color is associated with a multilevel image indicating the pixel position of each color for each character extraction operation, and the resultant data is set as a ZIP compression target. If the image cannot be expressed by the predetermined number of colors, the original image before color reduction processing is set as a JPEG compression target.

Figure 10:
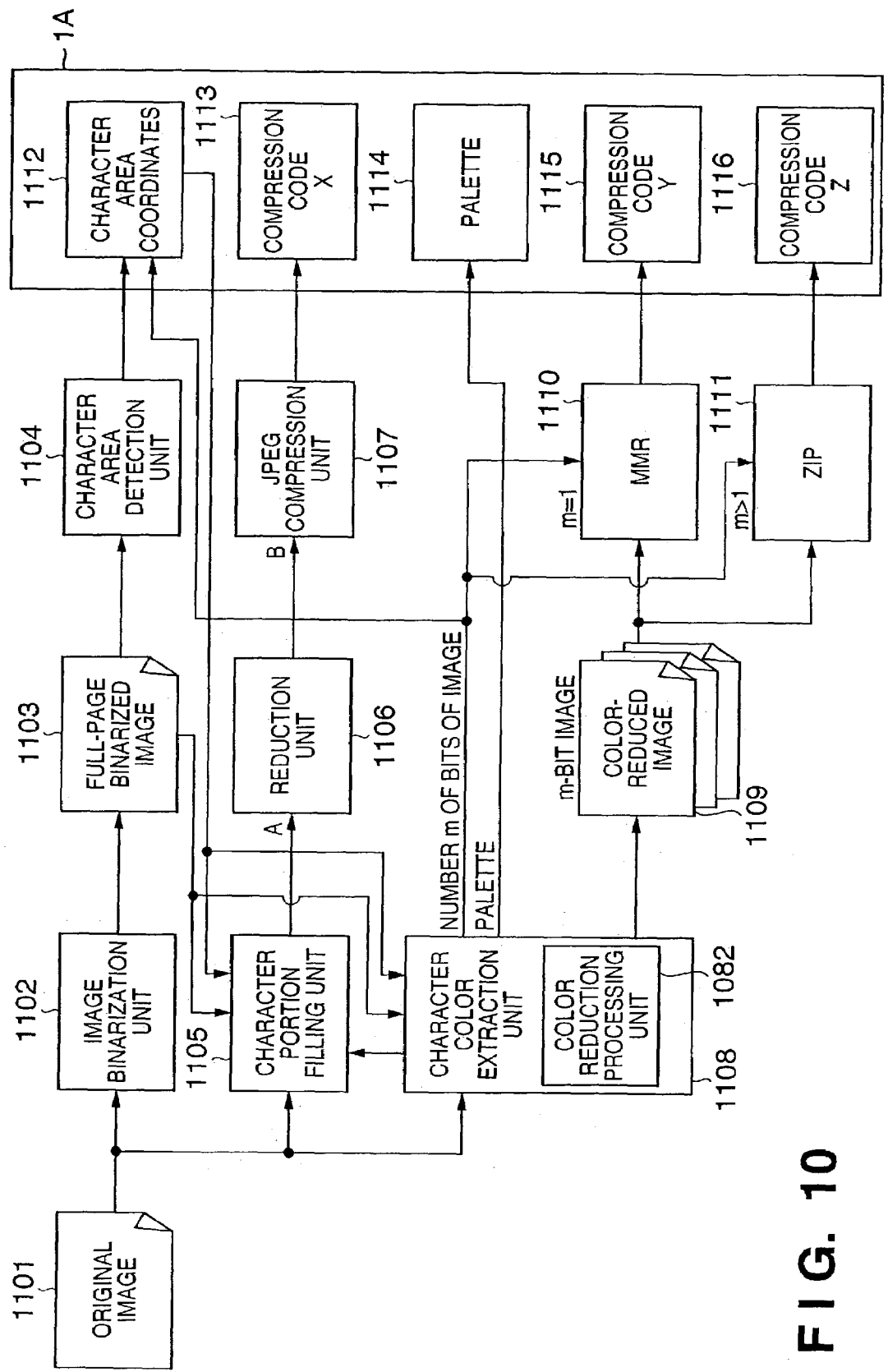
FIG. 10 is a block diagram for explaining processing for the execution of an image compression method in the second compression mode and intermediate images.

FIG. 10 is a block diagram for explaining processing for the execution of an image compression method in the second compression mode and intermediate images. Referring to FIG. 10, reference numeral 1101 denotes an original image; 1102, an image binarization unit which receives an original image and performs optimal binarization of the image; 1103, a full-page binary image binarized by the image binarization unit 1102; and 1104, a character area detection unit which receives the full-page binary image 1103, detects a character area, and generates character area coordinates 1112.

Reference numeral 1108 denotes a character color extraction unit which receives the character area coordinates 1112, generates a plurality of palettes 1114 by calculating the original image color of the black portion of a binary image while referring to an original image within the coordinates and the binary image, and performing color reduction processing of the original image.

Reference numeral 1105 denotes a character portion filling unit which extracts, from the original image, an area which is detected as a character by the character area detection unit 1104 and is a black area of the binary image 1103 in the area where the number of character colors is reduced to less than M by the character color extraction unit 1108, and fills the extracted area with the surrounding color, thereby generating an image A.

Reference numeral 1106 denotes a reduction unit which receives the image A and generates an image B by reducing the image A; and 1107, a JPEG compression unit which receives the image B and generates a compression code X (1113) by JPEG-compressing the image.

Reference numeral 1109 denotes color-reduced images in a plurality of character areas color-reduced by the character color extraction unit 1108; 1110, an MMR compression unit which receives a color-reduced image when the color-reduced image 1109 is 1bit, and generates a plurality of compression codes Y (1115) by MMR-compressing the image; and 1111, a ZIP compression unit which receives a color-reduced image when the color-reduced image 1109 is 2 bits or more, and generates a plurality of compression codes Z (1116) by ZIP-compressing the image. Finally, the data 1112 to 1116 are integrated into compressed data 1A.

[Character Area Detection Processing]

Figure 11:
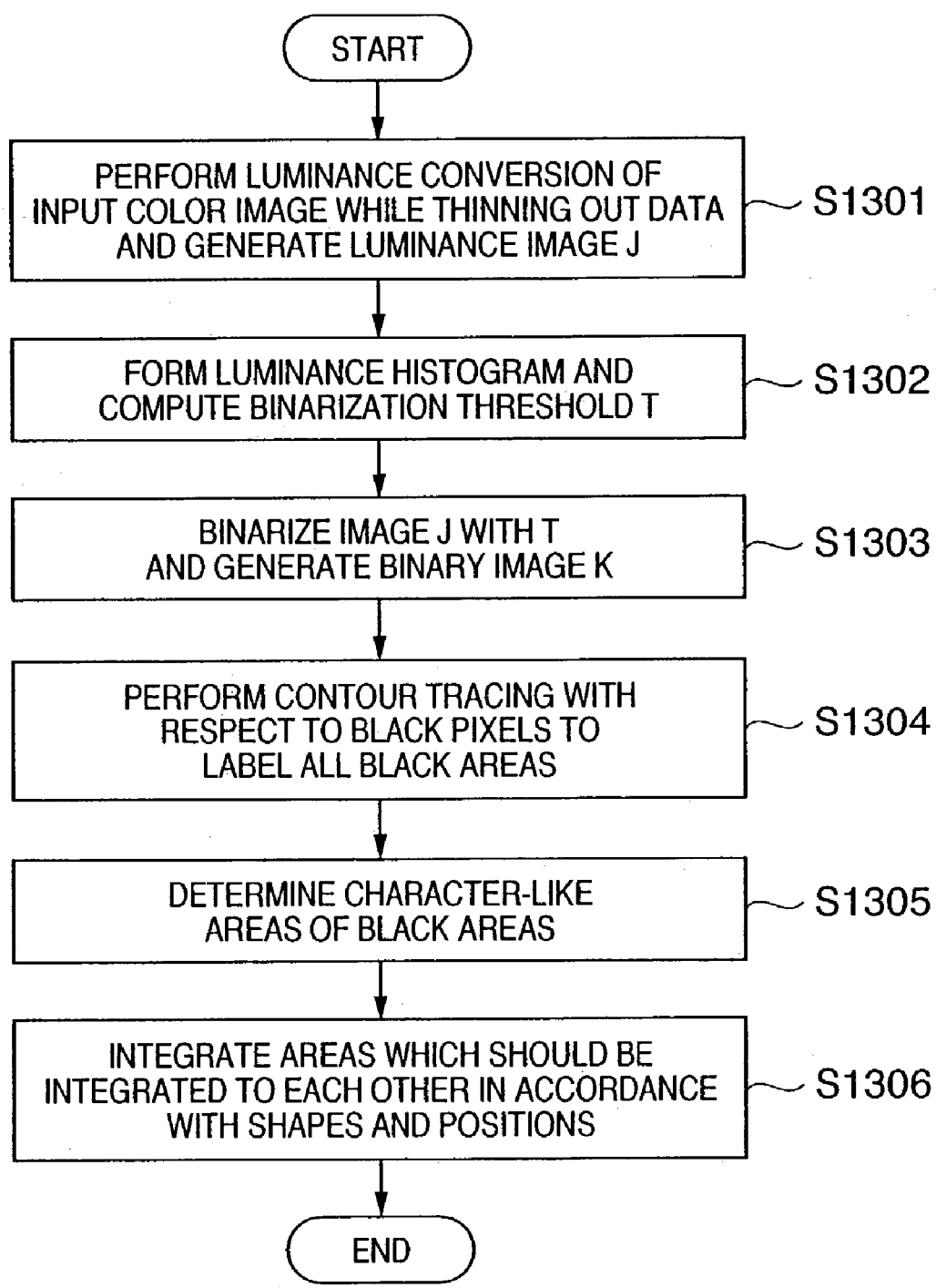
FIG. 11 is a flow chart for explaining character area detection processing in a character area detection unit 1104.

FIG. 11 is a flow chart for explaining character area detection processing in the character area detection unit 1104. First of all, a color image is input, and luminance conversion of the image is performed while the resolution is decreased by thinning out data, thereby generating a luminance image J (step S1301). If, for example, the original image is 300-dpi, 24-bit RGB data, the following arithmetic operation is performed for every four pixels in both the vertical and horizontal directions:

$Y=0.299R+0.587G+0.114B$ thereby generating a new image J. As a consequence, the image J becomes a 75-dpi, Y8-bit image. The histogram of the luminance data is then formed to calculate a binarization threshold T (step S1302).

The luminance image J is then binarized with the threshold T to form a binary image K (step S1303). In addition, contour tracing is performed with respect to black pixels to label all black areas (step S1304). Of the black areas, character-like areas are determined (step S1305). The areas which should be integrated are integrated to each other in accordance with the shapes and positions (step S1306).

[Character Color Extraction Processing for Character Area]

Figure 12:
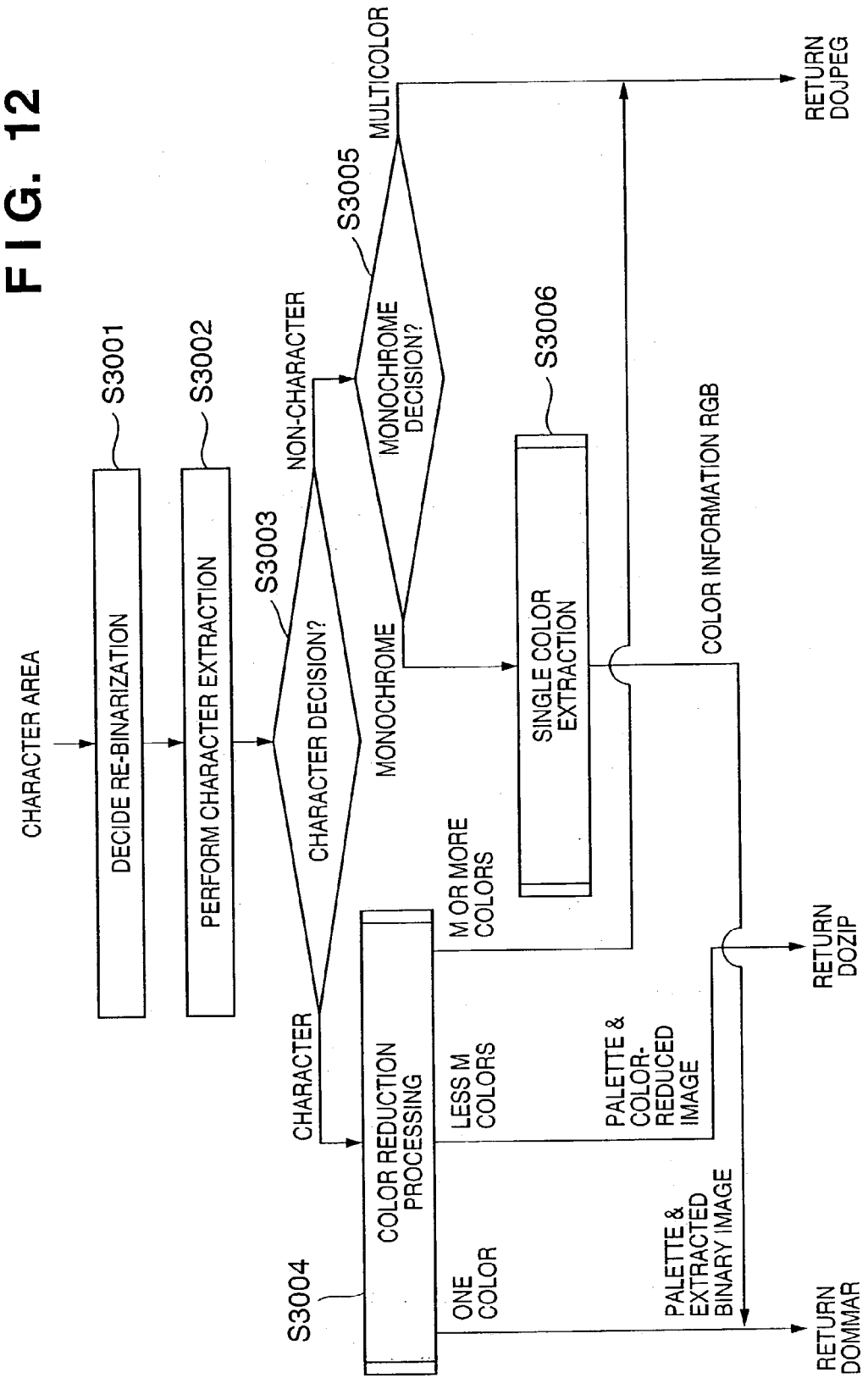
FIG. 12 is a flow chart for explaining character color extraction processing in a character color extraction unit 1108.

FIG. 12 is a flow chart for explaining character color extraction processing in the character color extraction unit 1108. In this case, the full-page binary image 1103 is used as a binary image. However, the present invention is not limited to this. For example, the coordinates of a character area and a color image may be input, and representative color computation processing may be performed by using the result obtained by re-binarizing the color image.

The processing shown in the flow chart of FIG. 12 is performed with respect to all the areas determined as characters by the character area detection unit 1104 in the following manner.

(Step S3001: Re-binarization Processing)

First of all, in step S3001, whether to perform re-binarization processing is decided. All the character areas of the full-page binary image 1103 are not necessarily binarized properly. Both an excessively dark binary image and an excessively light binary image affect the resultant image quality. Ideally, therefore, optimal binarization is preferably performed for each character area.

More specifically, the character area detection unit 1104 scans the binary image in an area determined as a character and performs pattern matching with an isolated point filter. The character area detection unit 1104 then checks whether isolated points equal to or more than a threshold exist in the area. If isolated points equal to or more than the threshold exist, the luminance histogram of the area is formed to calculate an optimal threshold, thereby performing re-binarization. If this area is a normal character area, a better binary image can be obtained by partially applying the luminance histogram. In some rare cases, however, a worse result is obtained (i.e., a darker binary image is obtained after re-binarization).

In order to prevent such a phenomenon, exceptional processing of, for example, inhibiting re-binarization is prepared for a case wherein when the binarization threshold which is previously used to obtain a full-page binary image is input in re-binarization processing, it is determined by comparison between the previous threshold and a threshold for re-binarization that the resultant image becomes darker.

(Step S3002: Character Extraction Processing)

In step S3002, character extraction information is generated. The contents of character extraction processing change depending on whether a character area is a horizontal or vertical writing area. Information indicating whether a given area is a horizontal or vertical writing area is decided and formed from a row of black clusters by the character area detection unit 1104. If a horizontal writing area is decided as a result of this processing, a projection of black pixels of the binary image is formed in the main scanning direction. After a break of a line is detected, a projection of black pixels is formed for each line in the sub-scanning direction, thereby obtaining information about each character. If a vertical writing area is decided, line extraction is performed in the sub-scanning direction, and character extraction is performed in the main scanning direction. At this time, in order to properly cope with even a slight inclination of an image, a projection for line extraction may be formed in three segments in the row direction. With this processing, the coordinate information of each line and coordinate information of each character existing on each line can be obtained.

In character decision processing (step S3003 to be described later), character extraction information is used to further check whether each black object in an area which is determined as a character by the character area detection unit 1104 is a character. More specifically, the character area detection unit 1104 checks from the size and shape of one character whether each black object is a character. For example, from the viewpoint of image quality and compression, there is no need to place any importance to "being a character" for the sake of conversion to a monochrome or multicolor image. For example, a mark or the like expressed in monochrome is preferably expressed as a JPEG image rather than a monochrome MMR image in terms of both image quality and compression ratio. However, since areas other than character areas are likely to be expressed as gradation images, it is important to check whether a given area is a character area.

(Step S3003: Character Decision Processing)

In step S3003, character decision is performed. In this step, the information used for character extraction (step S3002) is input, and an average character size on each line is computed. In this case, a better result can be obtained by neglecting the information of an extremely small character. In addition, a character rectangle extremely larger than the average size is determined as a non-character. Furthermore, when it is evident from aspect ratio information or the like that the shape of a given portion is anything other than characters, this portion is determined as a non-character.

Assume that m characters exist in the area, and it is determined as a result of the above determination that all the m characters are non-characters. In this case, the character area detection unit 1104 outputs a result indicating that this area is an image area.

If, however, n characters of the m characters (m>n, n≧0) are non-characters, i.e., rectangles as characters are left, the character area detection unit 1104 erases black objects determined as non-characters from the binary image, and outputs a result indicating that this area is a character area.

This embodiment additionally has the following exceptional processing in consideration of final image quality. Assume that 10 characters exist in an area, and five characters are skippingly expressed as monochrome characters while the remaining characters are determined as non-characters and JPEG-compressed. In this case, an image with "unevenness" is obtained, which is a visually undesirable image. For this reason, in this character decision processing, if character/image decision frequently varies in a given area, the area is uniformly decided as a rectangular character or rectangular image as a whole on the basis of the arrangement of rectangles, the frequency with which rectangles are decided as characters, and the like.

If a given area is decided as a character area in the above character decision processing, the flow advances to step S3004. If the area is decided as a non-character area, the flow advances to step S3005.

(Step S3005: Monochrome Decision Processing)

In step S3005, monochrome decision is performed. This processing is applied to an area which is determined as a character by the character area detection unit 1104 but is determined as a non-character in character decision processing. As described above, any area expressed in monochrome is preferably expressed in monochrome and MMR-compressed in consideration of both image quality and compression ratio regardless of whether the area is a character area or not. It is therefore decided whether this area is a monochrome area.

More specifically, histograms are formed at the levels of the respective R, G, and B pixels of a color image which correspond to a black portion of a binary image. If the variances of all the histograms are equal to or less than a threshold, it is determined that this area is a monochrome area. If it is determined as a result of this determination processing that the area is a monochrome area, the flow advances to single color extraction processing in step S3006. If it is determined that the area is a multicolor area, DOJPEG is returned.

(Step S3006: Single Color Extraction Processing)

Figure 13:
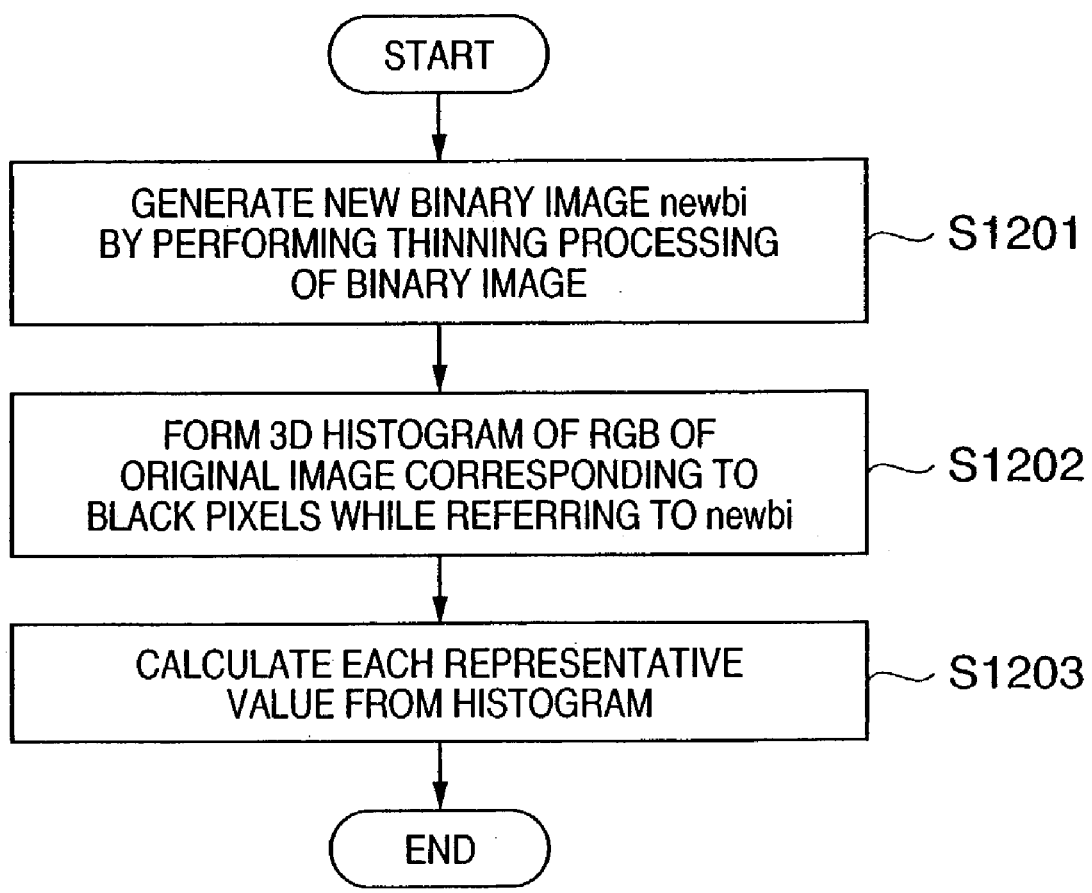
FIG. 13 is a flow chart for explaining single color extraction processing in the second compression mode.

Single color extraction processing in step S3006 will be described with reference to the flow chart of FIG. 13. FIG. 13 is a flow chart for explaining single color extraction processing in the second compression mode. First of all, thinning processing is performed with respect to a binary image, which is referred to for the corresponding character coordinates, so as to reduce black pixels corresponding to a transitional portion from a ground to a character portion during a scanner read time, thereby generating a new binary image newbi (step S1201).

The histograms of the respective R, G, and B values of an original image corresponding to black pixels of the binary image newbi are formed (step S1202). Obviously, this processing may be performed in another color space such as YUV. The representative values of the respective R, G, and B values are calculated (step S1203). For example, each representative value may be the largest value. Alternatively, representative values may be obtained first by a method of obtaining the largest values by using rough histograms formed by decreasing the number of steps for the formation of histograms, and then obtaining the largest values by using fine histograms existing in the rough histograms.

Figure 14:
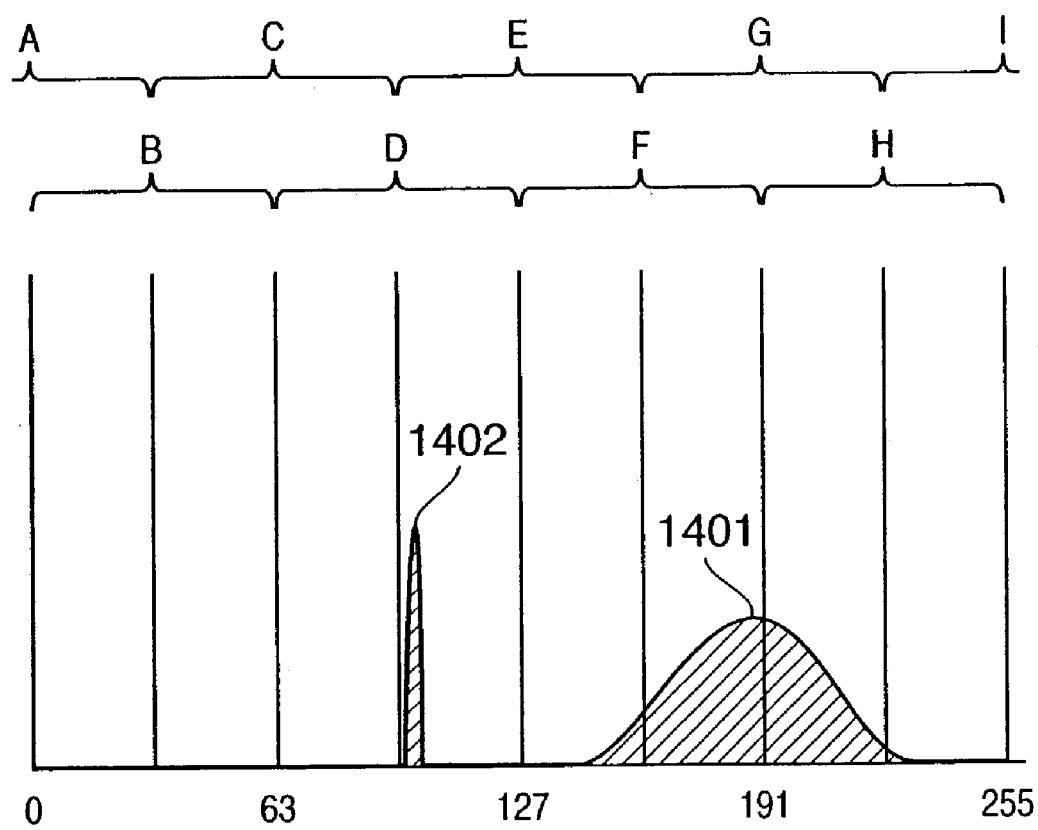
FIG. 14 is a chart for explaining a representative value calculation method in single color extraction processing.

Using the latter method makes it possible to obtain a true representative value 1401 from a histogram like the one shown in FIG. 14 without being misled by noise 1402. FIG. 14 is a graph for explaining a method of calculating a representative value in single color extraction processing. As a fine histogram, for example, a 256-level histogram like the one shown in FIG. 14 can be obtained from 8-bit R data. The maximum value in this case is the value 1402, which is not a true representative value. The width of this histogram is therefore divided into 64 overlapping widths, and an 8-level histogram is re-calculated from the 256-level histogram. These eight ranges are indicated by A to H. However, each of the ranges A and H has only a width of 32. It is known from this re-calculation that the representative value exists in the range G. The value 1401 can therefore be obtained by searching for the maximum value in the range G. By repeating the above processing with respect to all character coordinates, representative colors are calculated one by one for all the character coordinates.

(Step S3004: Color Reduction Processing)

In step S3004, color reduction processing is performed for a character. In a color reduction processing unit 1082, with regard to the color of a character portion, even if an original is expressed in monochrome, there is a color transitional portion from a ground to a character portion during a scanner read time.

Figure 15:
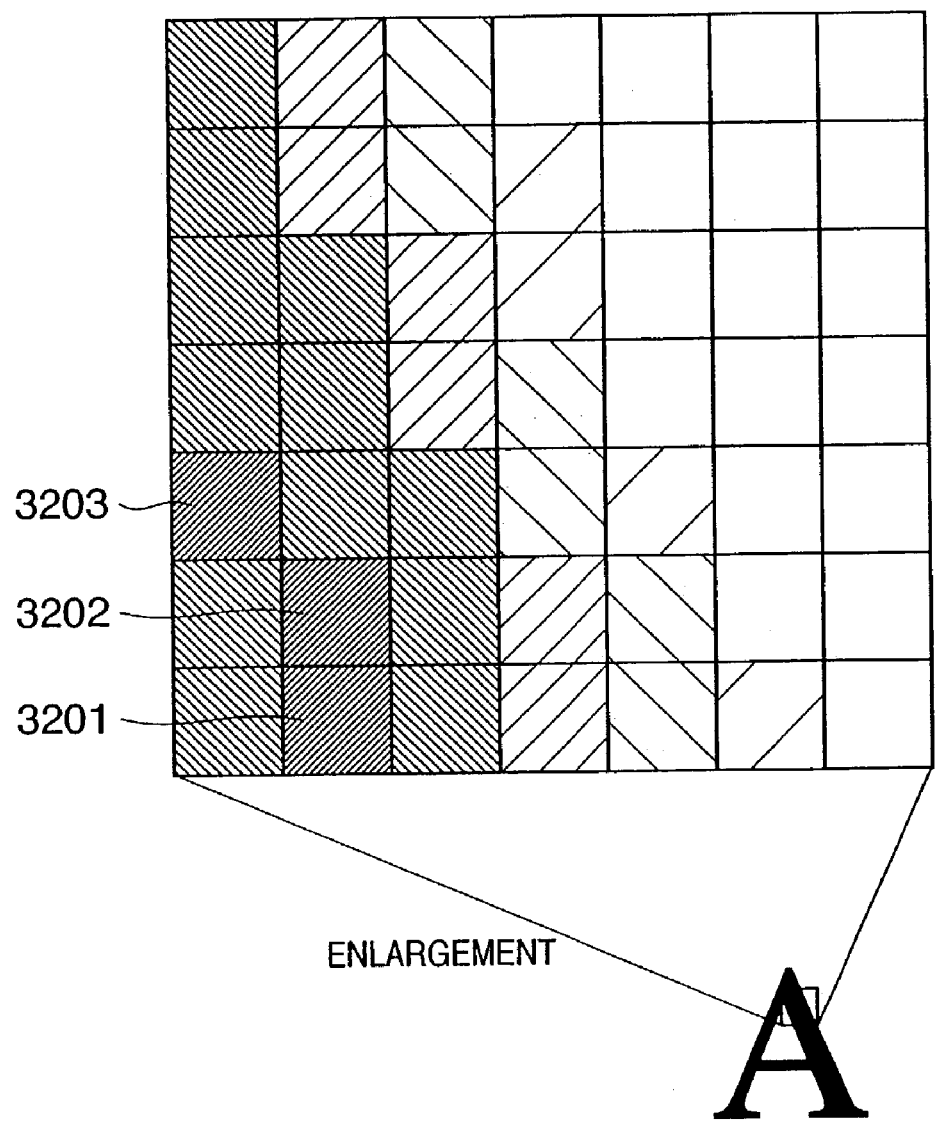
FIG. 15 is a view for explaining a transitional portion (gradation) in a character portion which is produced by a scanner.

FIG. 15 is a chart for explaining a transitional portion (gradation) of a character portion which is generated by the scanner. For the sake of simplicity, this portion will be described by exemplifying only R of R, G, and B with reference to FIG. 15, and a description of G and B will be omitted. The character A is originally expressed in one color of R=32 levels. When this character is read by the scanner, the read data vary as indicated by the enlarged pixels. Referring to FIG. 15, only three pixels 3201, 3202, and 3203 reach black near level R=32, and the remaining pixels fall at levels between the ground color (e.g., white) and R=32. As a consequence, the character is expressed in gradation with a transitional portion.

Figure 16:
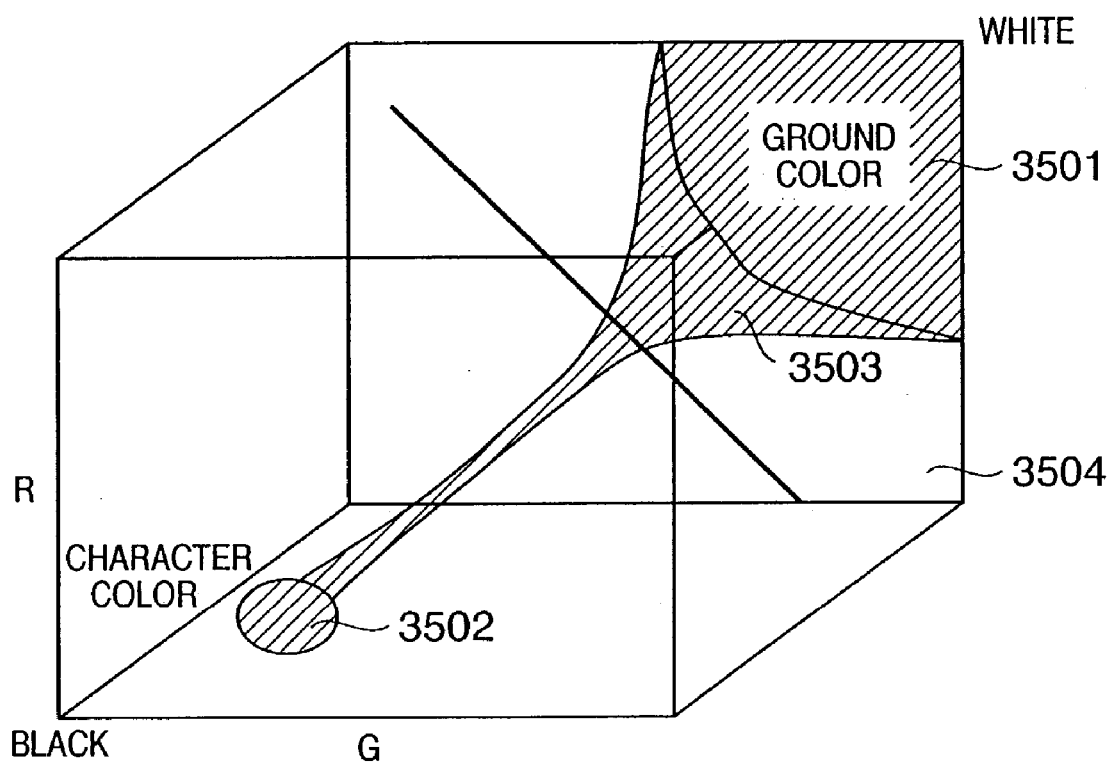
FIG. 16 is a view showing, in a 3D histogram, the transitional portion (gradation) in the character portion which is produced by the scanner.

FIG. 16 is a chart showing the transitional portion (gradation) of a character portion, in the form of a 3D histogram, which is generated by the scanner. Referring to FIG. 16, the ground color is white denoted by reference numeral 3501, and the character color is black denoted by reference numeral 3502. In this case, the transitional portion is denoted by reference numeral 3503. In this case, there is no need to precisely express the transitional portion which is a variation of the character portion, originally expressed in monochrome, produced by scanner read operation. That is, expressing the character portion in only the representative color can obtain a high-quality image with a small data amount. However, even if the binary image is thinned, it is difficult to completely remove the color of the transitional portion from the ground to the character portion.

For this reason, by using the fact that one character is likely to be expressed in monochrome, one color is limited to one character using character extraction information to improve the image quality and compression ratio. When a character or the like expressed in gradation is to be compressed into a high-quality image, exceptional processing of, for example, determining whether the character is expressed in a plurality of colors may be added. That is, limiting one color to one character using character extraction information in this manner can eliminate a transitional portion produced as a variation when a character image originally expressed in monochrome is read by the scanner.

[Character Portion Filling Unit 1105]

Figure 17A:
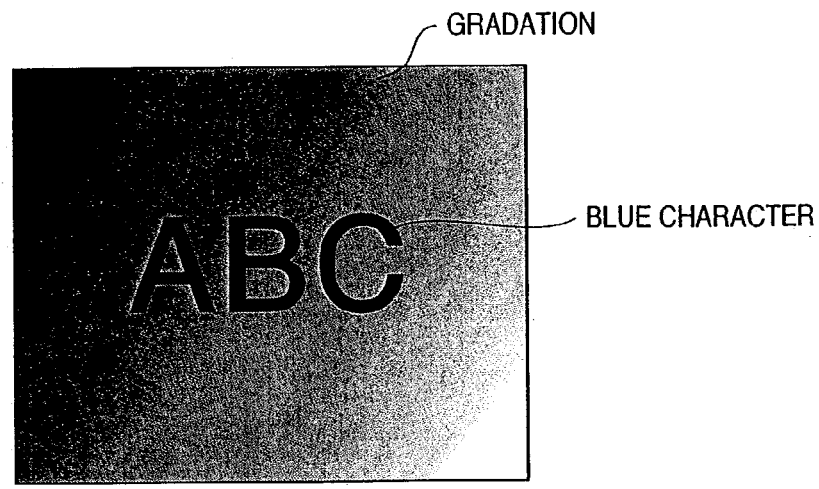
FIGS. 17A to 17C are views for explaining an outline of character filling processing.
Figure 17B:
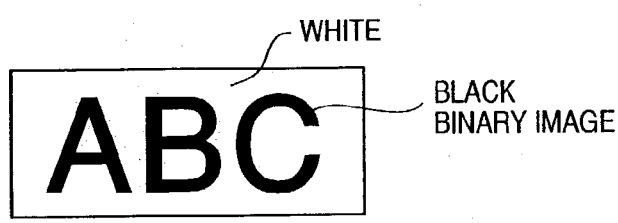

An example of the processing performed by the character portion filling unit 1105 will be described with reference to FIGS. 17A to 18. FIGS. 17A to 17C are views for explaining an outline of character filling processing. FIG. 18 is a flow chart for explaining the flow of character portion filling processing.

Assume that an original image has a gradation image as a background, and blue characters A, B, and C are drawn near the center, as shown in FIG. 17A. Assume also that a binary image of one character area like the one shown in FIG. 17B is obtained from this original image. In character portion filling processing, first of all, in step S11010, the entire image is segmented into 32×32 areas (to be referred to as parts hereinafter), and processing is performed for each part. FIG. 17C shows how the image is segmented into parts. For the sake of simple explanation, FIG. 17C shows a state wherein the image is segmented into 4×5 parts. The numeral at the upper left in each area in FIG. 17C indicates a part number. The number of parts segmented is not limited to this, and another number of parts segmented may be set.

In step S11020, it is checked whether there is any unprocessed part. If YES in step S11020, the flow advances to step S11030 to check whether any target area to be filled exists in the part. Note that even an area determined as a character area by the character area detection unit 1104 is not set as a target area to be filled if the character color extraction unit 1108 has returned DOJPEG with respect to this area.

Figure 17C:
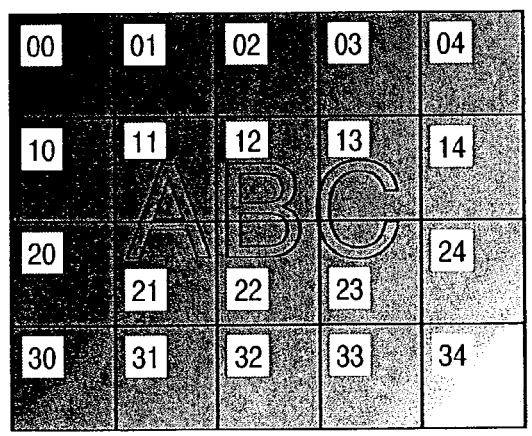
Figure 18:
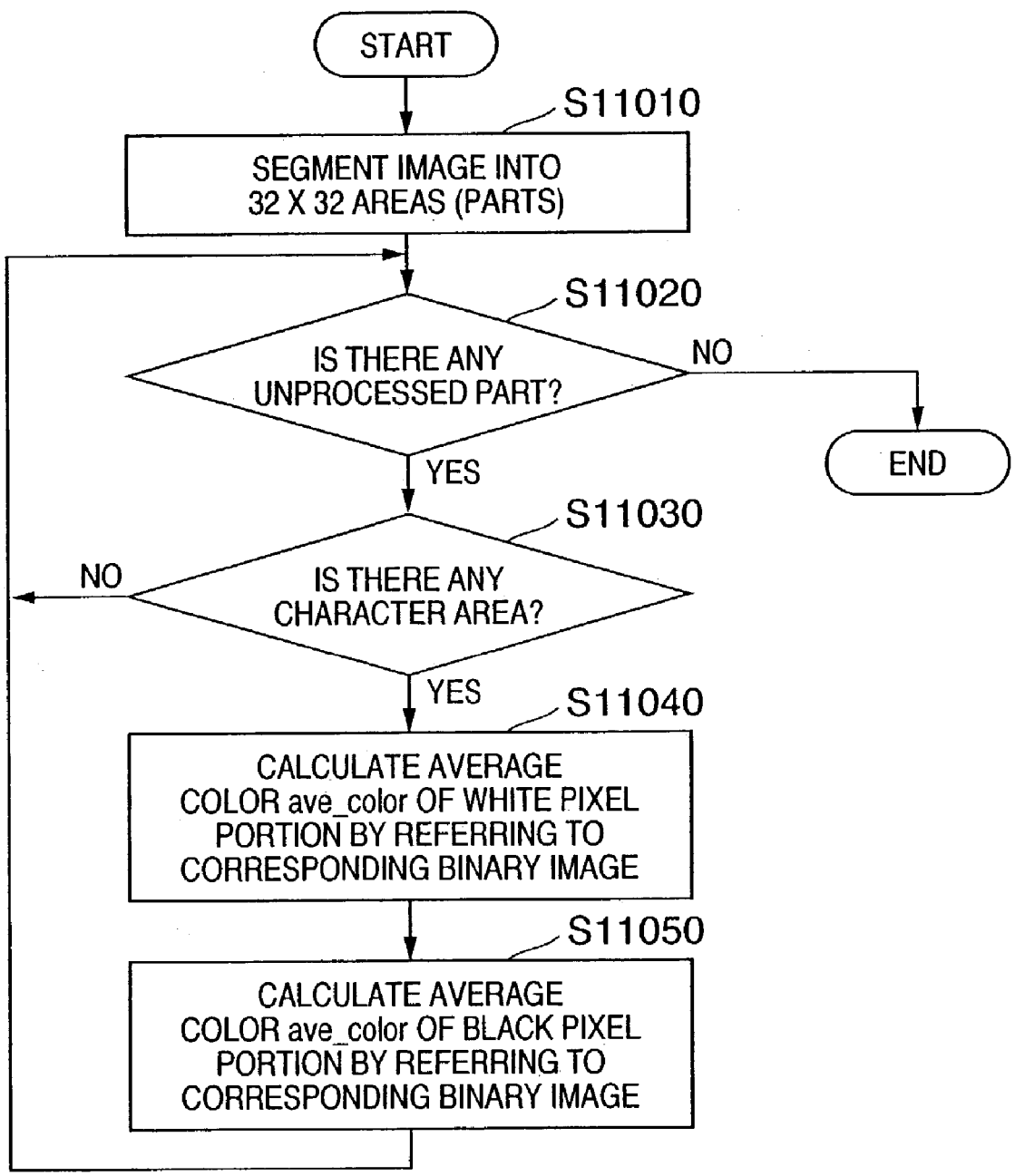
FIG. 18 is a flow chart for explaining character filling processing.

As shown in FIG. 17C, it is decided in step S11030 that there are no target areas to be filled in parts 00 to 04, 10, 14, 20, 24, and 30 to 35. Therefore, no processing is performed, and the flow advances to processing for the next part. With respect to a part (e.g., a part 11) in which a target area to be filled exists, the flow advances to step S11040 to refer to the corresponding binary image and calculate an average value ave_color of the RGB values (or, for example, YUV values) of the color image corresponding to the white portion of the binary image. In step S11050, the corresponding binary image is referred to, and the density data of a pixel corresponding to a black pixel is set to ave_color. The above processing is repeated for the parts in which target areas to be filled exist (in this case, parts 12, 13, 21, 22, and 23). In this manner, the portions where the characters existed can be filled with the average values of the values of the neighboring pixels.

The filled image obtained in this manner is reduced by the reduction unit 1106. In this embodiment, simple thinning processing is performed as an example. Note that the execution order of this reduction processing and character portion filling processing may be reversed. In this case, consideration must be given to any positional shift between the binary image and the color image.

In addition, a format that integrates five elements, namely the character area coordinate 1112, palette 1114, compression code X (1113), compression code Y (1115), and compression code Z (1116) is generated as needed.

As an example of the format integrating five elements, PDF of Adobe (registered trademark) or the like is conceivable. Adobe PDF is a format that can be displayed by a free application called Acrobat Reader (registered trademark) distributed by Adobe. This can prevent a trouble, e.g., the inability of the reception side to open the file because of the absence of the application that was used to generate the document. As other formats, XML and the like are available. XML is a description language to exchange and distribute documents and data through a network.

(Modification)

In the second compression mode described above, a binary image is generated with a single threshold for a full page. However, the present invention is not limited to this. For example, a binary image may be generated by computing an optimal threshold for each character area detected by the character area detection unit 1104. In this case, there is no need to perform re-binarization decision in step S3001 in the flow chart of FIG. 12.

In addition, the same binary image is used in the character portion filling unit 1105 and character color extraction unit 1108. However, the present invention is not limited to this, and the character portion filling unit 1105 and character color extraction unit 1108 may respectively incorporate optimal binarization units.

As described above, according to the present invention, a color document image can be properly compressed with a high compression ratio. In addition, the present invention can be applied to the compression of an image having both character and non-character areas as well as the above image having only the color document.

<Second Embodiment>

The second embodiment of the present invention will be described in detail below with reference to the accompanying drawings.

Figure 19:
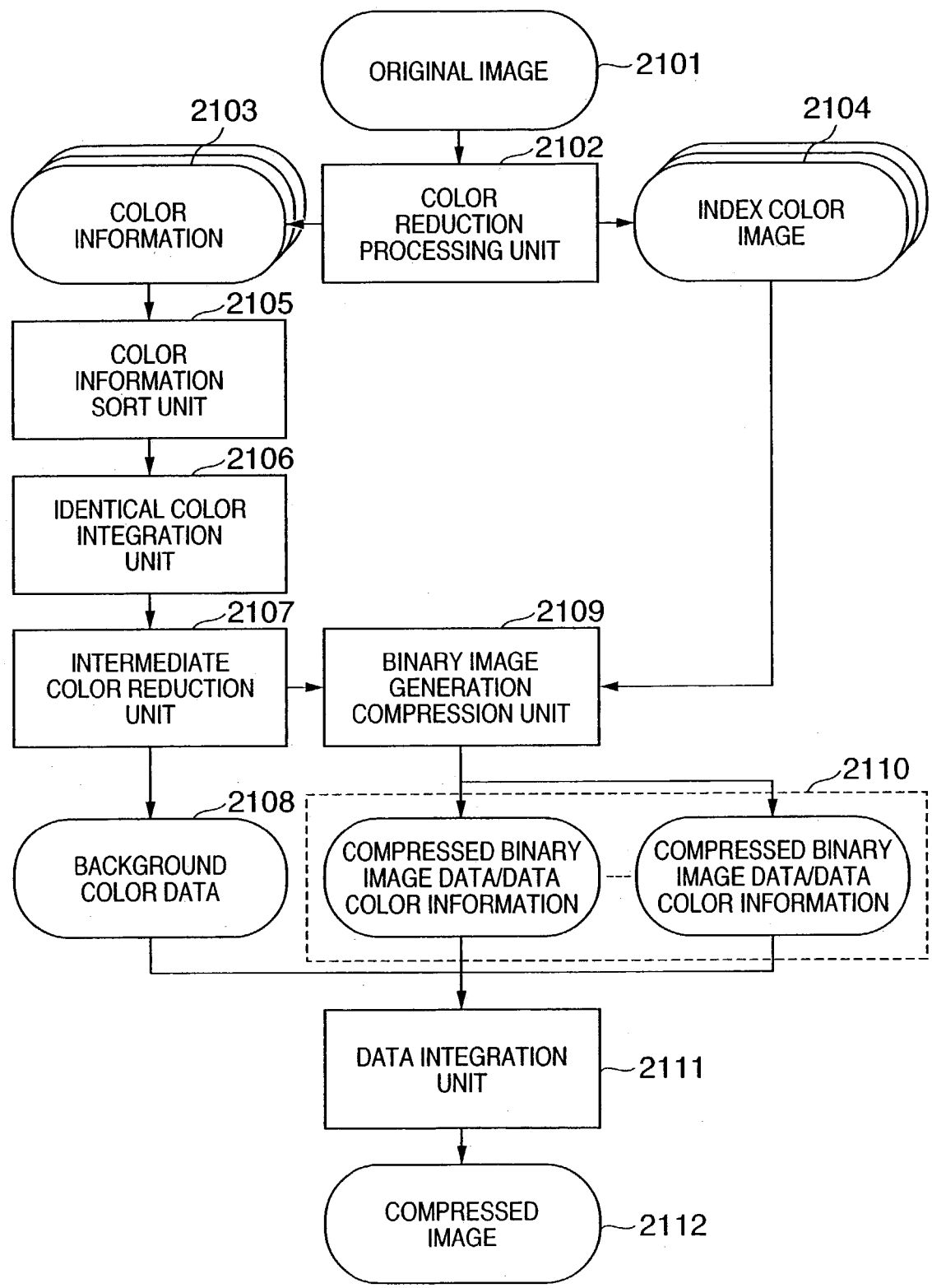
FIG. 19 is a view showing the functional arrangement of an image coding apparatus according to the second embodiment of the present invention and data which will be processed or have been processed by the respective units.

FIG. 19 shows the functional arrangement of an image coding apparatus according to this embodiment and data which will be processed or have been processed by the respective units. Reference numeral 2101 denotes an original image; 2102, a color reduction processing unit which performs simple color reduction processing of the original image 2101 to reduce it into a predetermined number of colors and indexes the resultant image (generates images each containing only a corresponding one of the colors left after color reduction (index color images 2104 to be described later) and assigns an index to each index color image); and 2103, color information which is constituted by data representing the color (color gravity) contained in an index color image generated by the color reduction processing unit 2102, data representing the number of pixels of the index color image, and data representing the position (distribution range) of the index color image in the original image, and is generated by the color reduction processing unit 2102 for each index color image.

Note that distribution range data is data containing the coordinates of the upper left corner and lower right corner of an index color image in the original image. Assume that the color information 2103 is associated with the corresponding index color image. For example, an index identical to the index added to the corresponding index color image is also added to the corresponding color image.

Reference numeral 2104 denotes an index color image which is an image containing only one of the colors contained in the image (color-reduced image) obtained by color reduction processing of the original image, as described above; 2105, a color information sort unit which sorts the color information 2103 according to the number of pixels; and 2106, an identical color integration unit which compares pieces of color information sorted by the color information sort unit 2105 with each other, decides them as identical colors depending on conditions to perform integration processing, and updates the color information subjected to the integration processing.

Reference numeral 2107 denotes an intermediate color reduction unit which compares pieces of sorted color information with each other, and integrates the pieces of color information depending on conditions to reduce the number of colors positioned at halftone levels; 2108, background color data which is color gravity data contained in highest rank color information (having the largest number of pixels) of the pieces of color information processed by the intermediate color reduction unit 2107; 2109, a binary image generation compression unit which generates a binary image by using an index color image corresponding to each left color information (except for the highest rank color information) and compresses the binary image; 2110, compressed binary image data which are the data generated by the binary image generation compression unit 2109, to each of which color information is added; and 2111, a data integration unit which generates a compressed image 2112 by integrating the background color data 2108 and compressed binary image data 2110.

The image coding processing performed by the image coding apparatus according to this embodiment having the above arrangement will be briefly described below with reference to FIG. 7. As described above, FIG. 7 is a view showing an original image (color image) and images of the areas of the respective colors in the original image. Red and black characters are written on the original which is the original image, and handwritten correction is made to the original by using blue ink. When color reduction processing, identical color determination processing, and intermediate color reduction processing are performed with respect to this color image, the color image is separated into a white partial image, black partial image, red partial image, and blue partial image. Of these separated partial images, the white partial image exhibits the largest number of pixels that constitute the image, and hence is used as a background image. In practice, the white partial image is not held as image data but is held as data indicating the size of the original image and a color value (indicating white). With regard to the black partial image, red partial image, and blue partial image, a binary image is generated for each color (in the case of the red partial image, for example, an image with "1" representing a red portion and "0" representing a ground), compresses it, and adds data indicating the color to the compressed data.

Figure 20:
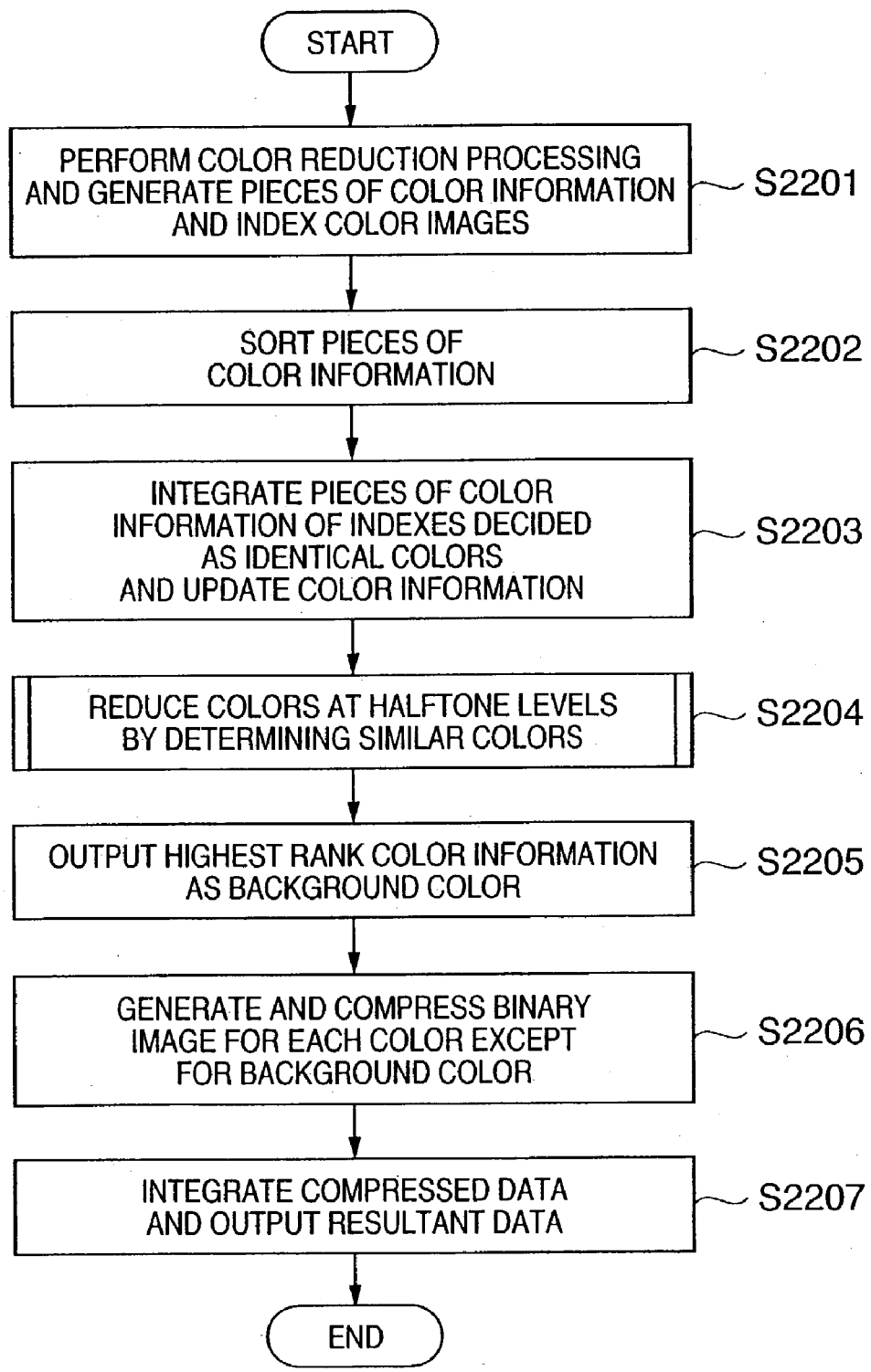
FIG. 20 is a flow chart showing the image compression processing performed by the image compression apparatus according to the second embodiment of the present invention.

The image coding processing performed by the image coding apparatus according to the second embodiment having the above arrangement will be described with reference to FIG. 20. FIG. 20 is a flow chart for the image coding processing performed by the image coding apparatus according to the second embodiment.

When the color image which is the original image 2101 is input to the color reduction processing unit 2102, the color reduction processing unit 2102 performs color reduction processing of the original image 2101 to reduce it to a predetermined number of colors, generates the pieces of color information 2103 and index color images 2104, and outputs them. Color reduction processing is performed to reduce the numbers of bits of full-color RGB 24-bit (each of R, G, and B is expressed by 24 bits) data to 2-2-2, 3-3-2, 3-3-3 bits, or the like. Such number of bits is selected depending on the desired degree of precision of color determination. Assume that in the following description, 2-2-2 bits (each of R, G, and B is expressed by 2 bits) are selected. However, the following description is not limited to this. As described above, each color information 2103 output from the color reduction processing unit 2102 is constituted by data representing the color (color gravity) contained in the index color image, the number of pixels of the index color image, and data representing the position (distribution range) of the index color image in the original image.

Each color information 2103 obtained by the color reduction processing unit 2102 is then input to the color information sort unit 2105 to be sorted according to the number of pixels and the value weighted according to the index number in step S2202. As a result of sorting, an index color image with a larger number of pixels is basically positioned at a higher rank. These weights, i.e., the factors, are values that are so adjusted as to position pieces of color information located closer to the primary colors at higher ranks when the pieces of color information with similar numbers of pixels are compared. FIGS. 3A to 3E are views showing examples of the weighting factors.

Figures 3A, 3B, 3C, 3D, 3E:
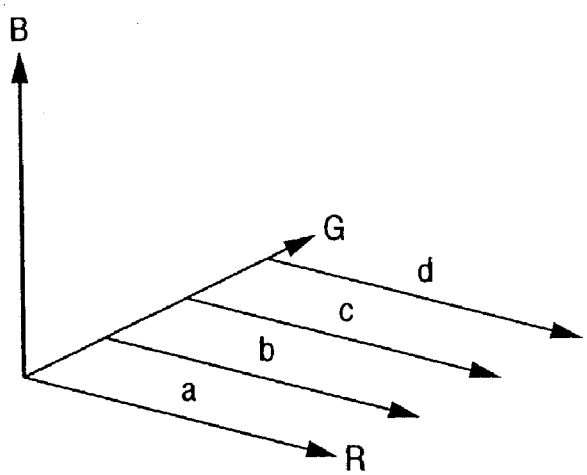
FIGS. 3A to 3E are views showing examples of weighting factors for sorting in a color information sort unit 105 in the first compression mode.

FIG. 3A is a view showing an RGB space. As described above, in this embodiment, since all the R, G, and B images after color reduction are expressed in four gray levels, four color elements exist in each of the R, G, and B directions. The weighing matrices shown in FIGS. 3B, 3C, 3D, and 3E are used for these four color elements existing in each of the R, G, and B directions. More specifically, each element of each matrix is used as a magnification with respect to the number of corresponding color elements (the number of pixels of a corresponding color).

FIG. 3B is a view showing the matrix of weighting factors corresponding to color elements at the respective positions in a plane which includes the straight line indicated by "a" in FIG. 3A and is parallel to an R-B plane. FIG. 3C is a view showing the matrix of weighting factors corresponding to color elements at the respective positions in a plane which includes the straight line indicated by "b" in FIG. 3A and is parallel to the R-B plane. FIG. 3D is a view showing the matrix of weighting factors corresponding to color elements at the respective positions in a plane which includes the straight line indicated by "c" in FIG. 3A and is parallel to the R-B plane. FIG. 3E is a view showing the matrix of weighting factors corresponding to color elements at the respective positions in a plane which includes the straight line indicated by "d" in FIG. 3A and is parallel to the R-B plane.

Note that the values (0.9 to 1.2) of the elements of the respective matrices shown in FIGS. 3B to 3E are not limited to those shown therein, and may be changed depending on the number of colors reduced by the color reduction processing unit 2102 and the priority levels of the respective colors.

Referring back to FIG. 20, in step S2203, the pieces of color information sorted by the color information sort unit 2105 are input to the identical color integration unit 2106. The identical color integration unit 2106 compares the color gravity values of the respective pieces of color information. If these values are relatively close to each other (for example, the absolute value of the difference between the respective values is equal to or less than a predetermined value), the identical color integration unit 2106 determines that the pieces of color information compared represent identical colors, and integrates them. In this processing, colors that are originally identical to each other but separated into a plurality of colors because one of R, G, and B values is accidentally close to a threshold in the first color reduction processing are restored to one color. Along with this integration processing, the number of pixels, color gravity, and color distribution range contained in the color information are re-calculated.

More specifically, the number of pixels contained in the integrated color information can be obtained by adding the numbers of pixels contained in the respective pieces of color information before the integration. In addition, the color gravity (average value) contained in the integrated color information can be obtained by adding the color gravities contained in the respective pieces of color information before the integration and dividing the sum by two. Furthermore, the distribution range contained in the integrated color information can be obtained by using the coordinates indicating the uppermost, leftmost corner and lowermost, rightmost corner of the distribution range data contained in the respective pieces of color information. With the above processing, color information can be updated upon integration of pieces of color information. Note that this color information update processing is only an example, and the present invention is not limited to this.

In step S2204, the intermediate color reduction unit 2107 converts the color gravity values contained in all pieces of color information including the color information updated by the identical color integration unit 2106 into luminance/color differences, compares the respective luminance/color difference values after conversion, and performs integration processing of pieces of color information whose color difference values are relatively close to each other (e.g., pieces of color information corresponding to the absolute value of the difference between the respective color difference values which is equal to or less than a predetermined value). With this processing, the number of colors positioned at halftone levels is reduced. The purpose of this processing is to remove many grayscale components produced between white and black at the boundary portions between white grounds and black character portions when, for example, even an original which is originally a monochrome document image is read by the scanner. That is, gray close to white is made white, and gray close to black is made black. The remaining colors are processed in the same manner.

The contents of the integration processing performed in step S2204 are the same as those in step 2203 except that the color gravity values are left unchanged. This is because leaving them unchanged prevents black from becoming brighter by being mixed with gray or prevents white from becoming darker as in the case wherein a color gravity is obtained upon integration of intermediate colors. As the representative color of the integrated color information, the color gravity of color information at a high sorting rank is used. In this case, weighting factors are used as well as the numbers of pixels in sorting to give high priority to the primary colors expected to be used for a color document original. The processing in step S2204 will be described in detail later.

In step S2205, of the processing results obtained by the intermediate color reduction unit 2107, the color gravity value of the highest rank color information is output as the background color data 2108. In step S2206, the binary image generation compression unit 2109 generates a binary image for each color by using color information other than the highest rank color information and the index color image 2104, and compresses it by MMR or the like. The binary image generated in this case has a size corresponding to the color distribution range held in the color information. If such an image exists on only part of the document, only the part is compressed and saved.

Consider this binary image for each color. If, for example, index numbers 0 to 63 are assigned to the index color images 2104, and color information with index 60 and color information with index 62 are integrated into index 63, this binary image is an image obtained by ORing the data with indexes 60 and 62, and is drawn with the color gravity value of the color information corresponding to index 63. As a result, the compressed binary image data 2110 is generated, which are data constituted by pieces of color information and MMR-compressed data.

Finally, in step S2207, the data integration unit 2111 generates the compressed image (output) 2112 by integrating the background color data 2108 and compressed binary image data 2110, and outputs the compressed data. An example of the arrangement of the compressed image 2112 is the same as that of the above compressed image 112 shown FIG. 4.

The compressed image 2112 is decoded into the original image by the following method. The entire area of the original is drawn in the background color stored in the header portion shown in FIG. 4. The MMR-compressed data contained in the compressed data are decompressed in the order in which they are stored. The resultant image is used as a mask, and images are sequentially overwritten in accordance with the stored positions and colors.

A flow chart showing the details of the processing in step S2204 described above is similar to the flow chart of FIG. 5 described above, and hence similar processing is performed.

First of all, in step S501, a list is generated according to the sorting order of pieces of color information. Intermediate color reduction processing is then performed in accordance with this list. In step S502, the RGB value of the color gravity of color information is converted into YCrCb luminance/color difference data, and this luminance/color difference data is added to the color information. Conversion to color differences is performed because this is suitable for reducing intermediate colors by integrating similar colors having similar luminance differences.

All the processing contents in steps S503, S504, and S505 are basically the same except for processing targets. That is, in each of these steps, it is checked by comparison whether the differences between Y, Cr, and Cr components fall within a predetermined threshold, and pieces of color information are integrated to reduce the number of colors if the above condition is satisfied.

The processing performed in steps S503, S504, and S505 is the same as that in the flow chart of FIG. 6. Although the processing performed according to the flow chart of FIG. 6 is common to the processing in steps S503, S504, and S505, the threshold used in the threshold processing in step S605 differs from the corresponding value.

First of all, in step S601, the highest rank color information in the above sorting results is selected as color information I. In step S602, the YCrCb value of the color information I is stored in a variable Y'Cr'Cb'. In step S603, the lowest rank color information in the sorting results is selected as color information J.

In step S604, the Y, Cr, and Cb values of the color information I and color information J are compared with each other to check whether the difference between the respective components fall within a predetermined threshold (different thresholds are used in steps S503, S504, and S505, as described above).

If it is determined in step S605 that the differences fall within the threshold, the flow advances to step S606. Otherwise, the flow advances to step S608. Assume that the Cr or Cb values of the color information I and color information J differ in sign. In this case, if the absolute value of the Cr or Cb value of the color information J is equal to or more than a predetermined value, this condition is not satisfied. Assume that the difference between the Cr values of the color information I and color information J falls within the threshold but differ in sign. In this case, the absolute value of the Cr value of the color information J is compared with a predetermined value. If the absolute value is smaller than the threshold, the flow advances to step S605. If the absolute value larger than the threshold, the flow advances to step S608. Similar processing is performed with respect to the Cb values. When pieces of color information are integrated after the differences are simply compared, pieces of color information of different colors such as light blue and light red may be integrated depending on the magnitudes of thresholds set in the flow chart of FIG. 5. The above processing is therefore performed to prevent this. In contrast to this, if thresholds are set to prevent integration of different colors such as light blue and light red, similar colors such as blue and light blue cannot be integrated.

In step S606, the color information I is integrated with the data of the color information J. This updates the respective data such as the number of colors of the color information I and the distribution range. However, the color gravity value is not updated. Instead of this operation, the color gravity of the integrated color is calculated, the color gravity is converted into luminance/color difference data, and this data is reflected in the above value Y'Cr'Cb'. In step S607, the color information J is excluded from the list. It is checked in step S608 whether the color information located higher than the color information J by one rank in the list is the color information I. If this information is not the color information I, the flow advances to step S609. If the information is the color information I, the flow advances to step S610.

In step S609, the color information located higher than the color information J by one rank is set to the color information J, and the flow returns to step S604. In step S610, the stored Y'Cr'Cb' value is restored to the YCrCb value of the color information I.

It is checked in step S611 whether the color information located lower than the color information I by one rank is the information at the lowest rank or is deleted from the list in step S607 and does not exist. If the information exists and does not located at the lowest rank, the flow advances to step S612. In step S612, the color information immediately below the color information I is set to the color information I, and the flow returns to step S602. If it is determined in step S611 that the color information immediately below the color information I is at the lowest rank, or is deleted from the list in step S607 and does not exit, the processing is terminated. Note that the list updated in the above processing is used after step S205 in a case wherein, for example, highest rank color information is to be referred to, and one of pieces of color information is to be selected as the one.

The thresholds used in step S605 are set such that the threshold for the luminance Y is slightly larger than that for the color difference CrCb to integrate similar colors. If this processing is to be executed as the processing in step S503, this threshold is set to be relatively small. The threshold is increased in steps S504 and S505 in the order named. The YCrCb value which is a temporary color gravity and added in step S502 is re-calculated in accordance with the processing based on the flow chart of FIG. 6 to integrate colors without setting very large thresholds in step S504 and the subsequent step.

Assume that in the first processing in step S503, light black is integrated with black. The YCrCb value as a temporary color gravity moves in the direction of light black. In this case, since the distance to dark gray decreases, dark gray can be integrated with black by only increasing the threshold to a certain degree in next step S504 and the subsequent step.

The processes in steps S503, S504, and S505 are performed to integrate colors in the decreasing order of similarity and control the size of the compressed image 2112 by changing these processes. As is obvious from FIG. 4, the number of compressed color data is one of the factors that determine the size of the compressed image 2112. That is, the compression size can also be controlled by controlling the number of colors that are finally left. Increasing the number of colors leads to a quality similar to that of the original color image, whereas decreasing the number of colors leads to a quality similar to that of a simple binary image. The number of steps may therefore be determined in accordance with the quality and compression size to be obtained.

According to the above description, the image coding method and apparatus according to this embodiment can efficiently compress most of color document images by having binary colors for the respective colors. In addition, sorting is performed according to the magnitudes of the products of the numbers of pixels of the respective colors and factors corresponding to their positions in the color space, and the identical color integration unit 2106 and intermediate color reduction unit 2107 perform color integration in accordance with the sorting order. The intermediate color reduction unit 2107 performs no re-calculation of a color gravity value. This makes it possible to realize good color reproduction. In addition, the intermediate color reduction unit 2107 has a plurality of thresholds and controls the number and values of thresholds, thereby controlling image quality and size.

According to the above description, the present invention can achieve an improvement in compression ratio and realize compression with good reproducibility.

<Other Embodiment>

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a recording medium (or a storage medium) storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is to be applied to the above recording medium, program codes corresponding to the flow charts described above are stored in the recording medium.

The present invention is not limited to the above embodiments and various changes and modifications can be made within the spirit and scope of the present invention. Therefore, to apprise the public of the scope of the present invention, the following claims are made.

What is claimed is:

1. An image compression method of compressing a color image, comprising:
    an index conversion step of converting each pixel of the color image into an index assigned in correspondence with a color value and generating color information containing the number of pixels for each indexed color and an index image obtained by converting each of the pixels into an index;
    a background determination step of determining a color value corresponding to a predetermined index in the index image as a background color of the color image;
    an order determination step of determining, on the basis of the color information and the background color, an order in which the color image is compressed for each index;
    a binary image generating step of generating a binary image for each index from the index image;
    a compression step of compressing the binary image according to the order; and
    a generating step of generating compressed image data by integrating background data containing a size of the color image and a color value of the background color and compressed data of the binary image for each of the indexes.

2. The method according to claim 1, wherein
    in the background color determination step, a color value corresponding to an index of the maximum number of pixels is determined as a background color of the color image, and
    in the order determination step, the binary image generating step, and the compression step, determination of an order with respect to the index and generation and compression of a binary image are not executed.

3. The method according to claim 1, wherein in the index conversion step, one index is made to correspond to color values in a predetermined range to reduce the number of bits of the color image, thereby generating an index image.

4. The method according to claim 1, wherein in the index conversion step, a color gravity and a color distribution range for each indexed color of the color image are counted as the color information.

5. The method according to claim 1, further comprising an identical color integration step of integrating pieces of color information, of the color information, which have the color gravities close to each other.

6. The method according to claim 1, further comprising an intermediate color reduction step of reducing intermediate colors by integrating pieces of color information, of the color information, which have luminance/color differences close to each other.

7. The method according to claim 5, wherein in the identical color integration step, sorting is performed according to a product of the number of pixels for each color in the color image and a factor determined in advance in accordance with a position of the color in a color space, and identical color determination is performed with reference to a sorting order.

8. The method according to claim 5, wherein in the identical color integration step, when identical colors are to be integrated into a color at a higher sorting rank, the counted number of pixels, the color distribution range, and the gravity of color values are re-calculated.

9. The method according to claim 6, wherein in the intermediate color reduction step, intermediate colors are reduced with reference to a sorting order.

10. The method according to claim 6, wherein in the intermediate color reduction step, when similar colors are to be integrated into a color at a higher sorting rank, the counted number of pixels and the color distribution range are re-calculated, and only the color gravity is not re-calculated.

11. The method according to claim 1, wherein in the background color determination step, a gravity of color values of a color positioned at a highest sorting rank is extracted as the background color.

12. The method according to claim 7, wherein in the intermediate color reduction step, a plurality of predetermined thresholds are held, gravities of color values are converted into luminance/color difference signals, and colors within a threshold range are integrated/reduced according to a sorting order.

13. The method according to claim 12, wherein a value obtained by converting the gravity of color values into a luminance/color difference signal is re-calculated as a temporary color gravity every time integration/reduction is performed.

14. The method according to claim 12, wherein the plurality of thresholds are changed in value depending on whether priority is given to a compression ratio or image quality.

15. The method according to claim 1, wherein in the compression step, the binary image is MMR-compressed.

16. The method according to claim 1, wherein an order is determined with reference to distances to the color determined in the background color determination step in the color space.

17. The method according to claim 1, wherein
image compression can be executed in a plurality of image compression modes,
in a first compression mode, the index conversion step, the background color determination step, the order determination step, the binary image generating step, the compression step, and the generating step are executed with respect to a color image as a coding target, and
in a second compression mode, an area identification step of identifying a character area and a non-character area of the color image, a second compression step of compressing an image of the character area according to a binary image algorithm, and a third compression step of compressing an image of the non-character area according to a multilevel image algorithm are executed with respect to a color image as a coding target.

18. An image compression method of compressing a color image, comprising:
an index conversion step of converting each pixel of the color image into an index assigned in correspondence with a color value and generating color information containing the number of pixels for each indexed color and an index image obtained by converting each of the pixels into an index;
a background determination step of determining a color value corresponding to a predetermined index in the index image as a background color of the color image;
an order determination step of determining an index order on the basis of the color information and the background color;
a binary image generating step of generating a binary image for each index from the index image;
a compression step of compressing the binary image according to the index order; and
a generating step of generating compressed image data by integrating background data containing a size of the color image and a color value of the background color and compressed data of the binary image for each of the indexes.

19. An image compression method of compressing a color image, comprising:
a sorting step of storing each pixel constituting the color image to one of a predetermined number of specific colors;
a specifying step of specifying a color of the specific colors which corresponds to a background color;
a ranking step of ranking the respective specific colors in a relationship in terms of overwriting with reference to a luminance value of the background color in accordance with luminance values of the specific colors except for the background color;
a generating step of generating, for each of the specific colors, a concatenated pixel group constituted by a pixel corresponding to the specific color and neighboring pixels of the pixel;
a replacing step of, for a concatenated pixel group corresponding to a predetermined specific color, when neighboring pixels contained in the concatenated pixel group include a pixel of a specific color ranked higher than the predetermined specific color in the relationship in terms of overwriting, replacing the neighboring pixel with the predetermined specific color; and
a compression step of compressing the concatenated pixel group obtained in the replacing step.

20. An image compression apparatus for compressing a color image, comprising:
index conversion means for converting each pixel of the color image into an index assigned in correspondence with a color value and generating color information containing the number of pixels for each indexed color and an index image obtained by converting each of the pixels into an index;
background determination means for determining a color value corresponding to a predetermined index in the index image as a background color of the color image;
order determination means for determining, on the basis of the color information and the background color, an order in which the color image is compressed for each index;
binary image generating means for generating a binary image for each index from the index image;
compression means for compressing the binary image according to the order; and
generating means for generating compressed image data by integrating background data containing a size of the color image and a color value of the background color and compressed data of the binary image for each of the indexes.

21. A computer-readable medium storing a computer program for causing a computer to execute
an index conversion procedure of converting each pixel of the color image into an index assigned in correspondence with a color value and generating color information containing the number of pixels for each indexed color and an index image obtained by converting each of the pixels into an index;
a background determination procedure of determining a color value corresponding to a predetermined index in the index image as a background color of the color image;
an order determination procedure of determining, on the basis of the color information and the background color, an order in which the color image is compressed for each index;
a binary image generating procedure of generating a binary image for each index from the index image;
a compression procedure of compressing the binary image according to the order; and
a generating procedure of generating compressed image data by integrating background data containing a size of the color image and a color value of the background color and compressed data of the binary image for each of the indexes.

* * * * *

UNITED STATES PATENT AND TRADEMARK OFFICE
CERTIFICATE OF CORRECTION

PATENT NO.         : 7,158,669 B2                                        Page 1 of 1
APPLICATION NO.    : 10/417102
DATED              : January 2, 2007
INVENTOR(S)        : Tanaka et al.

It is certified that error appears in the above-identified patent and that said Letters Patent is hereby corrected as shown below:

On the Title page,

[*] Notice:     Subject to any disclaimer, the term of this patent is extended or adjusted under 35 USC 154(b) by (818) days Delete the phrase "by 818" and insert -- by 798 days--

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,158,669 B2
APPLICATION NO. : 10/417102
DATED : January 2, 2007
INVENTOR(S) : Tetsuomi Tanaka et al.

It is certified that error appears in the above-identified patent and that said Letters Patent is hereby corrected as shown below:

COLUMN 1:

Line 46, "performed" should read --perform--.

COLUMN 2:

Line 26, "color-image," should read --color image,--.

COLUMN 11:

Line 50, "than" should read --than the--.

COLUMN 12:

Line 48, "in" should read --in the--.

COLUMN 13:

Line 40, "example," should read --example, to--; and
    Line 53, "have" should be deleted.

COLUMN 14:

Line 25, "become" should read --became--;
    Line 32, "However," should read --However, since--; and
    Line 38, "second-compression" should read --second compression--.

COLUMN 15:

Line 43, "1bit," should read --1 bit,--.

COLUMN 17:

Line 23, "decision" should read --decision processing--; and
    Line 62, "decision" should read --decision processing--.

UNITED STATES PATENT AND TRADEMARK OFFICE
CERTIFICATE OF CORRECTION

PATENT NO. : 7,158,669 B2
APPLICATION NO. : 10/417102
DATED : January 2, 2007
INVENTOR(S) : Tetsuomi Tanaka et al.

It is certified that error appears in the above-identified patent and that said Letters Patent is hereby corrected as shown below:

COLUMN 24:

Line 6, "step 2203" should read --step S2203--; and
Line 47, "shown" should read --shown in--.

COLUMN 25:

Line 6, "Cr" second occurrence should read --Cb--; and
Line 41, "value" should read --value is--.

COLUMN 26:

Line 10, "does" should read --is--.

COLUMN 29:

Line 9, "the" (second occurrence) should read --a--; and
Line 53, "storing" should read --sorting--.

Signed and Sealed this

Third Day of March, 2009

JOHN DOLL
*Acting Director of the United States Patent and Trademark Office*